(12) United States Patent
Takeda et al.

(10) Patent No.: US 11,064,467 B2
(45) Date of Patent: Jul. 13, 2021

(54) USER TERMINAL, RADIO BASE STATION AND RADIO COMMUNICATION METHOD

(71) Applicant: NTT DOCOMO, INC., Tokyo (JP)

(72) Inventors: Kazuki Takeda, Tokyo (JP); Tooru Uchino, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/563,714

(22) PCT Filed: Mar. 31, 2016

(86) PCT No.: PCT/JP2016/060649
§ 371 (c)(1),
(2) Date: Oct. 2, 2017

(87) PCT Pub. No.: WO2016/159230
PCT Pub. Date: Oct. 6, 2016

(65) Prior Publication Data
US 2018/0077698 A1    Mar. 15, 2018

(30) Foreign Application Priority Data

Apr. 2, 2015 (JP) .............................. JP2015-076143

(51) Int. Cl.
*H04W 72/04* (2009.01)
*H04L 1/18* (2006.01)
(Continued)

(52) U.S. Cl.
CPC ....... *H04W 72/0413* (2013.01); *H04L 1/1861* (2013.01); *H04L 5/001* (2013.01);
(Continued)

(58) Field of Classification Search
CPC ............. H04W 72/0413; H04W 72/04; H04W 72/0453; H04W 88/02; H04W 88/08;
(Continued)

(56) References Cited

U.S. PATENT DOCUMENTS 9,763,233 B2 * 9/2017 Uchino ................. H04L 5/0053
10,098,147 B2 * 10/2018 Ohta ................... H04W 74/006
(Continued)

FOREIGN PATENT DOCUMENTS

CN        104427550 A        3/2015

OTHER PUBLICATIONS

Office Action issued in the counterpart Japanese Patent Application No. 2017510183, dated Apr. 10, 2018 (5 pages).
(Continued)

*Primary Examiner* — Wutchung Chu
(74) *Attorney, Agent, or Firm* — Osha Bergman Watanabe & Burton LLP

(57) ABSTRACT

The present invention is designed so that UL transmission can be made adequately even when transmission of uplink control information using secondary cells (SCells) is made configurable. A user terminal communicates with a radio base station by using carrier aggregation, and has a receiving section that receives a DL signal transmitted from the radio base station, a transmission section that transmits uplink control information that is generated based on the DL signal received, and a control section that controls transmission of the uplink control information, and, in this user terminal, the control section controls the transmission of the uplink control information using an uplink control channel and controls the transmission of the uplink control information using an uplink shared channel in each of a plurality of cell groups, each cell group including at least one component carrier (CC).

8 Claims, 17 Drawing Sheets

(51) Int. Cl.
   *H04L 5/00* (2006.01)
   *H04W 88/02* (2009.01)
   *H04W 88/08* (2009.01)

(52) U.S. Cl.
   CPC .......... *H04L 5/0048* (2013.01); *H04L 5/0055* (2013.01); *H04W 72/0453* (2013.01); *H04W 88/02* (2013.01); *H04W 88/08* (2013.01)

(58) Field of Classification Search
   CPC ..... H04L 1/1861; H04L 5/001; H04L 5/0048; H04L 5/0055
   See application file for complete search history.

(56) References Cited

U.S. PATENT DOCUMENTS

| | | | | |
|---|---|---|---|---|
| 2012/0314674 | A1* | 12/2012 | Seo | H04L 1/1861 370/329 |
| 2013/0114474 | A1 | 5/2013 | Fu et al. | |
| 2013/0223299 | A1* | 8/2013 | Yang | H04L 1/1812 370/280 |
| 2013/0308550 | A1* | 11/2013 | Yin | H04W 72/044 370/329 |
| 2014/0192688 | A1* | 7/2014 | Yang | H04L 5/001 370/280 |
| 2014/0293893 | A1* | 10/2014 | Papasakellariou | H04W 72/0446 370/329 |
| 2015/0043394 | A1* | 2/2015 | Lin | H04L 1/1864 370/280 |
| 2015/0103705 | A1* | 4/2015 | Yang | H04L 1/1861 370/280 |
| 2015/0305000 | A1* | 10/2015 | Nguyen | H04L 1/1854 370/329 |
| 2016/0065345 | A1* | 3/2016 | Kim | H04W 72/0406 370/330 |
| 2016/0192388 | A1* | 6/2016 | Ekpenyong | H04L 1/1829 370/329 |
| 2016/0226630 | A1* | 8/2016 | Zhang | H04L 1/1861 |
| 2016/0242158 | A1* | 8/2016 | Takeda | H04L 5/14 |
| 2016/0374082 | A1* | 12/2016 | Nguyen | H04L 1/1887 |
| 2017/0094642 | A1* | 3/2017 | Lee | H04L 1/1887 |
| 2017/0280454 | A1* | 9/2017 | Kusashima | H04L 1/1812 |
| 2017/0373741 | A1* | 12/2017 | Yang | H04L 1/18 |
| 2018/0014259 | A1* | 1/2018 | Yang | H04L 1/18 |
| 2018/0019842 | A1* | 1/2018 | Fu | H04L 1/1864 |
| 2018/0034610 | A1* | 2/2018 | He | H04L 5/14 |
| 2018/0062796 | A1* | 3/2018 | Feng | H04L 1/1812 |
| 2018/0254862 | A1* | 9/2018 | Cheng | H04L 5/14 |
| 2019/0166598 | A1* | 5/2019 | Papasakellariou | H04L 1/0073 |

OTHER PUBLICATIONS

Office Action issued in corresponding Japanese Patent Application No. 2017-510183, dated Jan. 9, 2018 (5 pages).

International Search Report issued in PCT/JP2016/060649 dated Jun. 14, 2016 (2 pages).
Written Opinion of the International Searching Authority issued in PCT/JP2016/060649 dated Jun. 14, 2016 (4 pages).
Ericsson; "PUCCH on SCell for carrier aggregation"; 3GPP TSG-RAN WG1#80, R1-150321; Athens, Greece; Feb. 9-13, 2015 (3 pages).
Catt; "PUCCH on SCell for Rel-13 CA"; 3GPP TSG RAN WG1 Meeting #80, R1-150101; Athens, Greece; Feb. 9-13, 2015 (3 pages).
NTT Docomo; "Further details of UE capability aspects"; 3GPP TSG RAN WG1 Meeting #78bis, R1-144144; Ljubljana, Slovenia; Oct. 6-10, 2014 (3 pages).
NTT Docomo; "Remaining issues on TDD-FDD CA"; 3GPP TSG RAN WG1 Meeting #76, R1-140619; Prague, Czech Republic; Feb. 10-14, 2014 (6 pages).
Intel Corporation; "Support of PUCCH on Scell for CA"; 3GPP TSG-RAN WG1 #80, R1-150085; Athens, Greece; Feb. 9-13, 2015 (6 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
Extended European Search Report issued in the counterpart European Patent Application No. 16773110.8, dated Oct. 15, 2018 (9 pages).
Huawei, HiSilicon; "Details of reusing dual connectivity for PUCCH on SCell with CA"; 3GPP TSG RAN WG1 Meeting #78 R1-142834; Dresden, Germany, Aug. 18-22, 2014 (8 pages).
Catt; "UCI transmission for FDD-TDD carrier aggregation"; 3GPP TSG RAN WG1 Meeting #76 R1-140083; Prague, Czech Republic, Feb. 10-14, 2014 (3 pages).
Office Action issued in the counterpart European Patent Application No. 16 773 110.8, dated Oct. 23, 2019 (8 pages).
Office Action issued in the counterpart Japanese Patent Application No. 2018-130344, dated Apr. 2, 2019 (7 pages)
Office Action issued in the counterpart Japanese Patent Application No. 2018-130344, dated Aug. 27, 2019 (9 pages).
Office Action issued in the counterpart European Patent Application No. 16773110.8, dated Jun. 17, 2020 (6 pages).
Qualcomm Incorporated; "On the benefits of DAI for CA"; 3GPP TSG-RAN WG1 #62, R1-104781; Madrid, Spain, Aug. 23-27, 2010 (3 pages).
3GPP TS 36.213 V12.5.0, "3rd Generation Partnership Project; Technical Specification Group Radio Access Network; Evolved Universal Terrestrial Radio Access (E-UTRA); Physical layer procedures (Release 12)"; Mar. 2015 (16 pages).
Office Action issued in Japanese Application No. 2019-236863; dated Nov. 17, 2020 (6 pages).
Office Action issued in the counterpart Chinese Patent Application No. 201680020412.9, dated Jan. 6, 2021 (7 pages).
NTT Docomo, Inc.; "PUCCH on SCell for UEs supporting UL-CA"; 3GPP TSG RAN WG1 Meeting #80, R1-150509; Athens, Greece, Feb. 9-13, 2015 (7 pages).

* cited by examiner

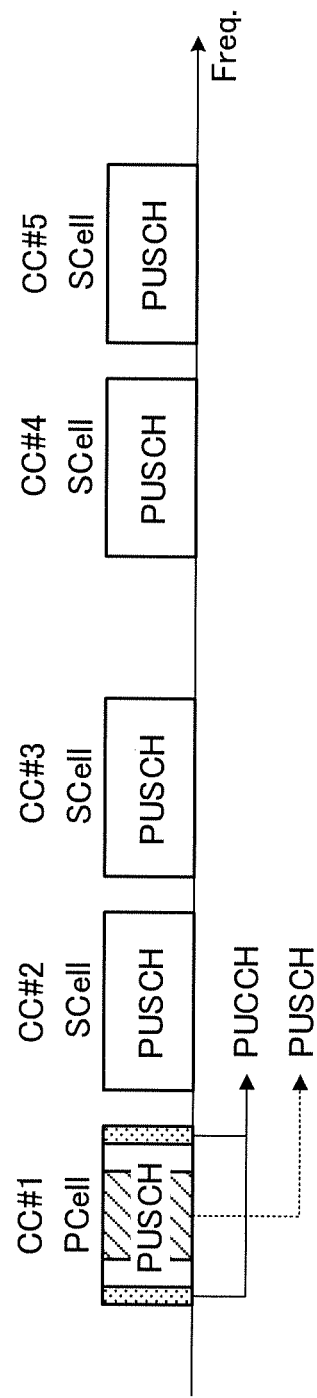 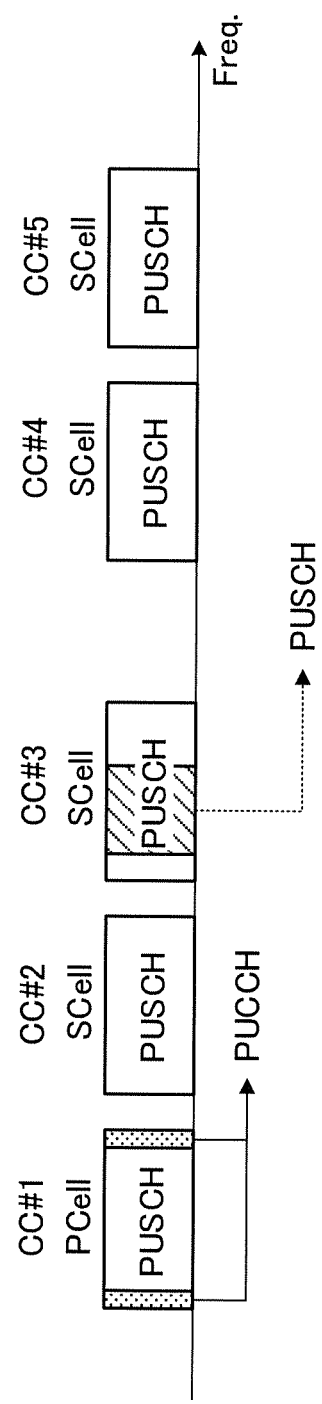
FIG. 2A
FIG. 2B

FIG. 6A

NW ALLOCATION → SF#0(DAI=1), SF#1(DAI=2), SF#2(DAI=3), SF#3(DAI=4)
UE DETECTION → SF#0(DAI=1), SF#1(~~DAI=2~~), SF#2(DAI=3), SF#3(DAI=4)

FIG. 6B

NW ALLOCATION → SF#0(DAI=1), SF#1(DAI=2), SF#2(DAI=3)
UE DETECTION → SF#0(~~DAI=1~~), SF#1(DAI=2), SF#2(DAI=3)

USER TERMINAL, RADIO BASE STATION AND RADIO COMMUNICATION METHOD

TECHNICAL FIELD

The present invention relates to a user terminal, a radio base station and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). Successor system of LTE— referred to as "LTE-advanced" (also referred to as "LTE-A")—have been under study for the purpose of achieving further broadbandization and increased speed beyond LTE, and the specifications thereof have been drafted as LTE Rel. 10 to 12.

The system band in LTE Rel. 10 to 12 includes at least one component carrier (CC), where the LTE system band constitutes one unit. Such bundling of a plurality of CCs into a wide band is referred to as "carrier aggregation" (CA).

In CA of Rel. 10 to 12, uplink control information (UCI) to be transmitted from a user terminal is transmitted in an uplink control channel (PUCCH). Also, when the PUCCH and the PUSCH have to be transmitted at the same time while simultaneous transmission of an uplink control channel and an uplink shared channel (PUSCH) is not configured, the user terminal multiplexes all the uplink control information on the PUSCH (piggyback).

CITATION LIST

Non-Patent Literature

Non-Patent Literature 1: 3GPP TS 36. 300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

In CA of and after LTE Rel. 13, which is a more advanced successor system of LTE, a method ("PUCCH on SCell") of transmitting uplink control information by using the PUCCHs not only of the primary cell, but also of secondary cells (SCells), in order to realize more flexible wireless communication, is under study.

However, when a user terminal transmits uplink control information by using the PUCCHs of secondary cells, if uplink data transmission (PUSCH transmission) is commanded in a certain CC, how to transmit the uplink control information and the uplink data becomes the problem.

The present invention has been made in view of the foregoing points, and it is therefore an object of the present invention to provide a user terminal, a radio base station and a radio communication method that allow adequate UL transmission even when transmission of uplink control information using secondary cells (SCells) is made configurable.

Solution to Problem

According to the present invention, a user terminal communicates with a radio base station by using carrier aggregation, and has a receiving section that receives a DL signal transmitted from the radio base station, a transmission section that transmits uplink control information that is generated based on the DL signal received, and a control section that controls transmission of the uplink control information, and, in this user terminal, the control section controls the transmission of the uplink control information using an uplink control channel and controls the transmission of the uplink control information using an uplink shared channel in each of a plurality of cell groups, each cell group including at least one component carrier (CC).

Advantageous Effects of Invention

According to the present invention, UL transmission can be made adequately even when transmission of uplink control information using secondary cells (SCells) is made configurable.

BRIEF DESCRIPTION OF DRAWINGS

FIG. 2 provide diagrams to show examples of simultaneous PUCCH-PUSCH transmission;

FIG. 6 provide diagrams to explain DAIs;

DESCRIPTION OF EMBODIMENTS

Figure 1A:
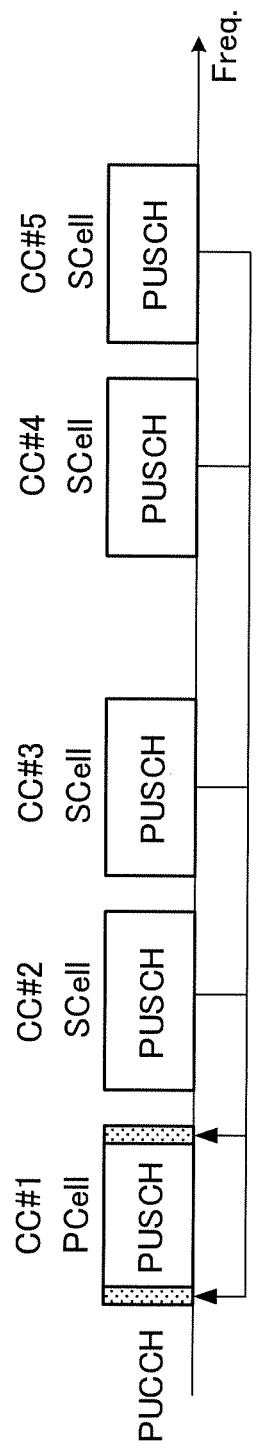
FIG. 1 provide diagrams to show examples of uplink control information allocation methods according to Rel. 12 and earlier versions.
Figure 1B:
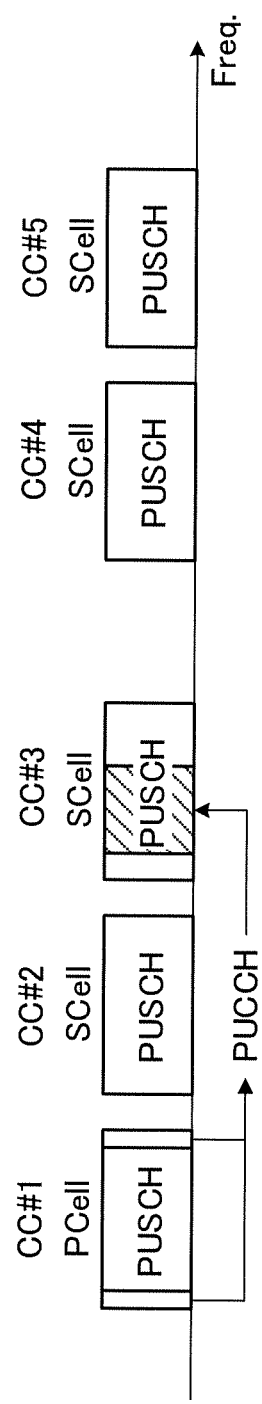

FIG. 1 provide diagrams to show examples of uplink control information (UCI) transmission methods according to Rel. 10 to 12. FIG. 1A shows a UCI multiplexing method that is for use when there is no uplink data transmission command (PUSCH transmission), and FIG. 1B shows a UCI multiplexing method that is for use when there is an uplink data transmission command. Also, FIG. 1 illustrate examples of cases where five CCs (one PCell and four SCells) are configured, and where simultaneous transmission of a PUCCH and a PUSCH is not configured.

FIG. 1A shows a case where, in a given subframe, PUSCH transmission is not carried out in CC #1 to CC #5. In this case, a user terminal multiplexes and transmits each CC's uplink control information on the PUCCH of a predetermined CC (here, CC #1).

FIG. 1B shows a case where there is uplink data (PUSCH transmission) to transmit to a radio base station in CC #3 (SCell) in a given subframe. In this case, a user terminal multiplexes (piggyback) and transmits uplink control information (uplink control information that should be transmitted in the PUCCH of CC #1) in the PUSCH of CC #3.

In this way, when simultaneous transmission of a PUCCH and a PUSCH is not configured, given that a user terminal does not transmit a PUCCH when there is a PUSCH to transmit, it is possible to maintain single carrier transmission. Note that a structure may be employed here in which, when PUSCH transmission takes place in multiple CCs, a PUCCH is allocated to a predetermined CC (the primary cell, the secondary cell with the minimum cell index, etc.).

Also, in CA of Rel. 10 to 12, simultaneous transmission of a PUCCH and a PUSCH (hereinafter "simultaneous PUCCH-PUSCH transmission") is supported. FIG. 2 show examples of uplink control information transmission methods for use when simultaneous PUCCH-PUSCH transmission is configured.

When simultaneous PUCCH-PUSCH transmission is configured, uplink control information is transmitted by using PUCCHs alone, or by using some PUCCHs and some PUSCHs. Simultaneous PUCCH-PUSCH transmission has two patterns—namely, simultaneous PUCCH-PUSCH transmission within a CC and simultaneous PUCCH-PUSCH transmission across CCs.

FIG. 2A shows a case where, when simultaneous PUCCH-PUSCH transmission within a CC is configured, a user terminal simultaneously allocates (multiplexes) a PUCCH and a PUSCH to one CC (here, the primary cell). FIG. 2B shows a case where, when simultaneous PUCCH-PUSCH transmission across CCs is configured, a user terminal simultaneously allocates a PUCCH and a PUSCH to different CCs. Here, a case is shown where the PUCCH is allocated to the primary cell (CC #1) and the PUSCH is allocated to a secondary cell (CC #3).

In this way, when simultaneous PUCCH-PUSCH transmission is configured, a PUCCH and a PUSCH are transmitted simultaneously within the same CC or across different CCs.

Also, with CA of Rel. 13 and later versions, a study is in progress to transmit uplink control information by using not only the PUCCH of the PCell, but also by using the PUCCHs of SCells (referred to as "PUCCH on SCell"). In particular, in Rel. 13 and later versions, a study is in progress to apply CA, in which the number of CCs, which has been limited to five CCs or fewer until Rel. 12, is expanded. When CA is executed with an expanded number of CCs, it is possible to prevent the concentration of uplink control information in the PCell by applying PUCCH on Scell.

To transmit uplink control information by using an SCell's PUCCH, it may be possible to configure a plurality of cell groups, which are each comprised of at least one CC, and determine the transmission timing and/or the PUCCH resource per cell group. A cell group like this may be referred to as a "PUCCH cell group," a "PUCCH CG," or a "PUCCH cell-group." Also, an SCell in which a PUCCH is configured in a cell groups may be referred to as a "PUCCH cell," a "PUCCH CC," or a "PUCCH-SCell."

Figure 3:
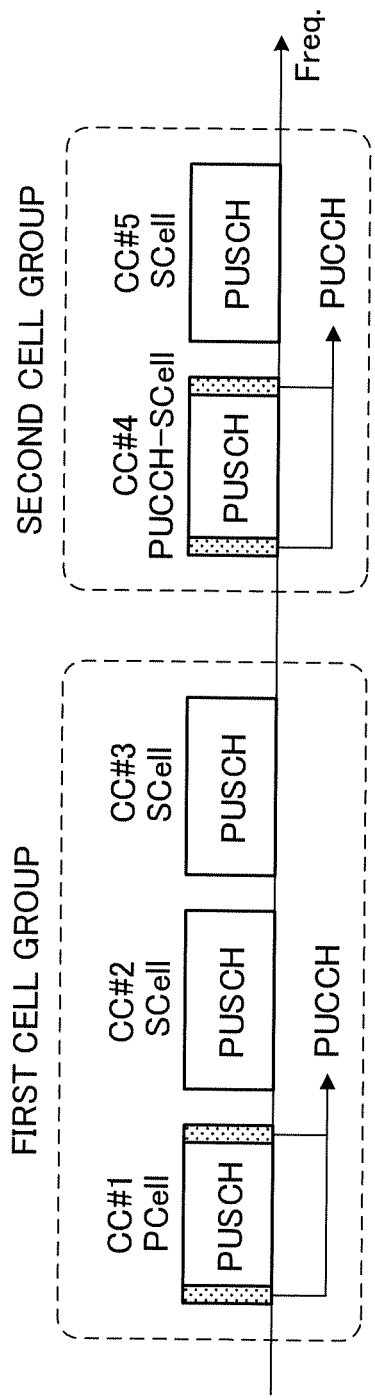
FIG. 3 is a diagram to show an example of the case of controlling PUCCH transmission per cell group.

FIG. 3 shows a case where two cell groups are configured in CA in which five CCs are configured. FIG. 3 shows the case where the first cell group is comprised of CC #1 to CC #3 and the second cell group is comprised CC #4 and CC #5, and where CC #1 is the PCell and CCs #2 to #5 are SCells.

A user terminal can transmit uplink control information using the PUCCH configured in one CC in each cell group. FIG. 3 presumes the case where the first cell group transmits a PUCCH in CC #1, which serves as the primary cell, and where the second cell group transmits a PUCCH in CC #4, which serves that serves as a PUCCH-Scell.

Thus, by controlling the transmission of uplink control information by configuring the allocation of PUCCHs every predetermined cell group, it is possible to transmit uplink control information properly even when the number of CCs is expanded. Meanwhile, when simultaneous PUCCH-PUSCH transmission is configured, A PUCCH and a PUSCH are transmitted simultaneously within the same CC or across different CCs.

So, assuming the case where PUCCH transmission (PUCCH on SCell) is controlled by configuring cell groups, the present inventors have come up with the idea of controlling the transmission of uplink control information using the PUSCH (UCI on PUSCH) in each cell group or across cell groups.

Also, in Rel. 13 and later, it may be possible that each cell group configures HARQ timings based on a different duplex mode (FDD or TDD). Assuming this case, the present inventors have come with the idea of determining the number of HARQ bits to be transmitted from a user terminal based on predetermined conditions, and controlling the transmission of HARQ-ACKs.

Now, embodiments of the present invention will be described in detail below with reference to the accompanying drawings. Note that, although cases will be shown in the following description in which the number of CCs is five, the embodiments of the present invention are by no means limited to this. The embodiments of the present invention are applicable to cases where the number of CCs is four or less or to cases where the number of CCs is six or more. Further, although the embodiments of the present invention are particularly suitable for use in cases where simultaneous PUCCH-PUSCH transmission is not configured in each cell group, this is by no means limiting. Although examples will be shown in the following description where two cell groups of the first cell group and the second cell group will be used as a plurality of cell groups, the number of cell groups is not limited to this.

First Example

A case will be described with the first example where the transmission of uplink control information (UCI on PUSCH) is controlled using an uplink shared channel, in each of a plurality of cell groups, where each group includes at least one component carrier (CC).

Figure 4:
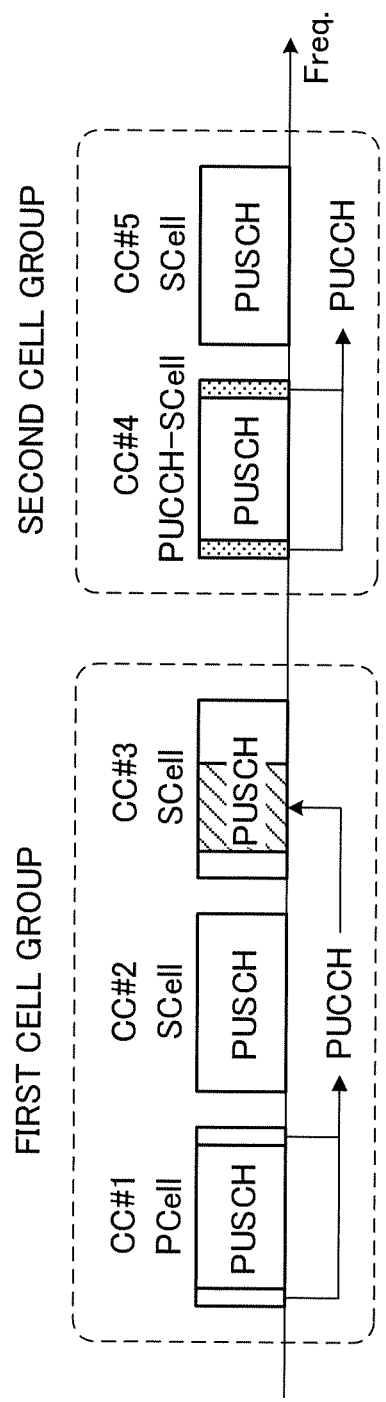
FIG. 4 is a diagram to show an example of the uplink control information transmission method according to a first example.

FIG. 4 shows an example of a case where the transmission of uplink control information using the PUSCH is controlled on a per cell group basis. FIG. 4 shows a case where a first cell group with three CCs and a second cell group with two CCs are configured in a user terminal. Information about the CCs and/or cell groups to configure in the user terminal can be reported to the user terminal through higher layer signaling (for example, RRC signaling and so on).

Further, FIG. 4 shows a case where a PUCCH is transmitted by using CC #1, which serves as the PCell in the first cell group, and where a PUCCH is transmitted by using CC #4, which serves as a PUCCH-Scell in the second cell group.

For example, assume the case where, in a given subframe, a PUSCH is transmitted in CC #3 (SCell) of the first cell group and where no PUSCH is transmitted in the second cell group. In this case, in the first cell group, when there is no PUSCH transmission, uplink control information (for example, HARQ-ACKs) transmitted in the PUCCH of CC #1 is multiplexed on the PUSCH of CC #3. On the other hand, in the second cell group, uplink control information is transmitted using the PUCCH of CC #4.

The required communication quality differs between a cell group including a PCell that secures connectivity through mobility management and communication quality measurements and a cell group not including a PCell. Cell groups not including a PCell are highly likely to be additionally used to improve throughput, and yet securing the quality of UCI is not necessarily guaranteed. However, in this way, according to the first example, the transmission of uplink control information using the PUCCH and the transmission of uplink control information using the PUSCH are controlled on a per cell group basis, so that the UCI of the PCell, which can secure the quality of connection, can be transmitted from the PCell, and the UCI of SCells, which are added for improved data rates, can be transmitted from the SCells. As a result, it is possible to achieve both quality assurance and off-loading of UCI.

Further, the user terminal may transmit periodic channel state information (P-CSI) on a per cell group basis. In existing CA, only one CC's P-CSI can be reported per subframe, and other CCs' CSIs are not allowed to be reported at the same time (that is, dropped). By contrast, with the first example, it is possible to configure P-CSI reports of varying cell groups in the same period and in the same timing. This enables highly accurate scheduling in the radio base station based on the P-CSI of each cell group.

Also, the user terminal can configure different HARQ timings in each cell group. For example, the user terminal can control HARQ transmission by applying the HARQ timing based on the FDD scheme to the first cell group (first CG), and control HARQ transmission by applying the HARQ timing based on the TDD scheme to the second cell group (second CG) (see FIG. 5).

For the HARQ timing based on the FDD scheme and/or the HARQ timing based on the TDD scheme, the timings defined in and before Rel. 12 can be used. For example, as the HARQ timing based on the FDD scheme, it is possible to use the timing a predetermined period (for example, four subframes) after the subframe in which a DL signal is received. In addition, as the HARQ timing based on the TDD scheme, a predetermined timing based on the UL/DL configuration can be used.

The HARQ timing to apply to each cell group can be determined based on the duplex mode used in a CC where PUCCH transmission is performed (PCell, PUCCH-SCell, etc.).

In the first cell group, which uses the HARQ timing based on the FDD scheme, the user terminal feeds back uplink control information (for example, HARQ) corresponding to each DL subframe in the UL subframe that comes four subframes later. When a PUSCH is transmitted in the UL subframe, uplink control information is allocated to the PUSCH and transmitted (see FIG. 5).

In the second cell group, in which the HARQ timing based on the TDD scheme is used, the user terminal feeds back uplink control information in a predetermined UL subframe according to the HARQ timing corresponding to a predetermined UL/DL configuration (here, UL/DL configuration 2). When a PUSCH is transmitted in the predetermined UL subframe, uplink control information is allocated to the PUSCH and transmitted (see FIG. 5).

In this way, when uplink control information feedback using the PUCCH and/or the PUSCH is controlled on a per cell group basis, cases occur where the number of DL subframes to which HARQ can be transmitted in a given UL subframe is different in each cell group. For example, in the second cell group using the HARQ timing based on the TDD scheme, HARQ-ACKs to correspond to a plurality of DL subframes temporally are transmitted in the PUSCH. On the other hand, in the first cell group using the HARQ timing based on the FDD scheme, basically, an HARQ-ACK to correspond to one DL subframe is transmitted in the PUSCH.

Therefore, in the first example, different transmission/reception operations (for example, different HARQ operations) are applied to each cell group, on the assumption that the HARQ which the user terminal transmits per cell group corresponds to varying numbers of DL subframes. To be more specific, in the cell group using the HARQ timing based on the TDD scheme, the user terminal receives/detects DL signals using DAIs (Downlink Assignment Indices), and controls HARQ transmission.

For example, DAIs can be used as a DL subframe counter in TDD in which A/N bundling is employed, and DAIs can be included in PDSCH-scheduling downlink control information (DCI) and PUSCH-scheduling DCI, and reported to the user terminal.

For example, when DL signals are transmitted to the user terminal in four consecutive subframes (SF #0 to SF #3) the radio base station transmits DAIs=1 to 4 in each of the DCIs that schedule the PDSCH in SFs #0 to #3 and transmits the same. If the user terminal fails to detect the DL assignment (PDCCH) in SF #1, the user terminal cannot acquire DAI=2, so the user terminal can judge that the DL assignment in SF #1 is a detection error (see FIG. 6A). As a result, the user terminal can recognize that the A/N for second SF #1 is wrong.

Also, when DL signals are transmitted to the user terminal in three subframes (SFs #0, #2 and #3), DAIs=1 to 3 are included in the DCIs for scheduling the PDSCH in SFs #0, #2 and #3. If the user terminal fails to detect the DL assignment (PDCCH) of SF #0, the user terminal cannot acquire DAI=1, so the user terminal can judge that the DL assignment of SF #0 or #1 is a detection error (see FIG. 6B). As a result, the user terminal can recognize that the first A/N (SF #0 or SF #1) is wrong.

Meanwhile, a DAI can be included in DCI (UL grant) that schedules the PUSCH in an uplink subframe (SF #2) for the user terminal. Unlike PDSCH-scheduling DCIs, only one UL grant is generated in one uplink subframe. Therefore, a DAI included in PUSCH-scheduling DCI does not report PDSCH that is scheduled as a counter, but reports the total number of PDSCHs corresponding to the PUSCH specified by this UL grant.

Accordingly, the user terminal, when detecting a UL grant, determines the number of bits of A/N acknowledgment signals to multiplex on the PUSCH (piggyback) according to the value indicated by the DAI included in the UL grant.

As described above, the user terminal can learn information (the number of DL subframes) about the DL subframes to which DL signals are allocated, based on DAIs transmitted from the radio base station.

Figure 7:
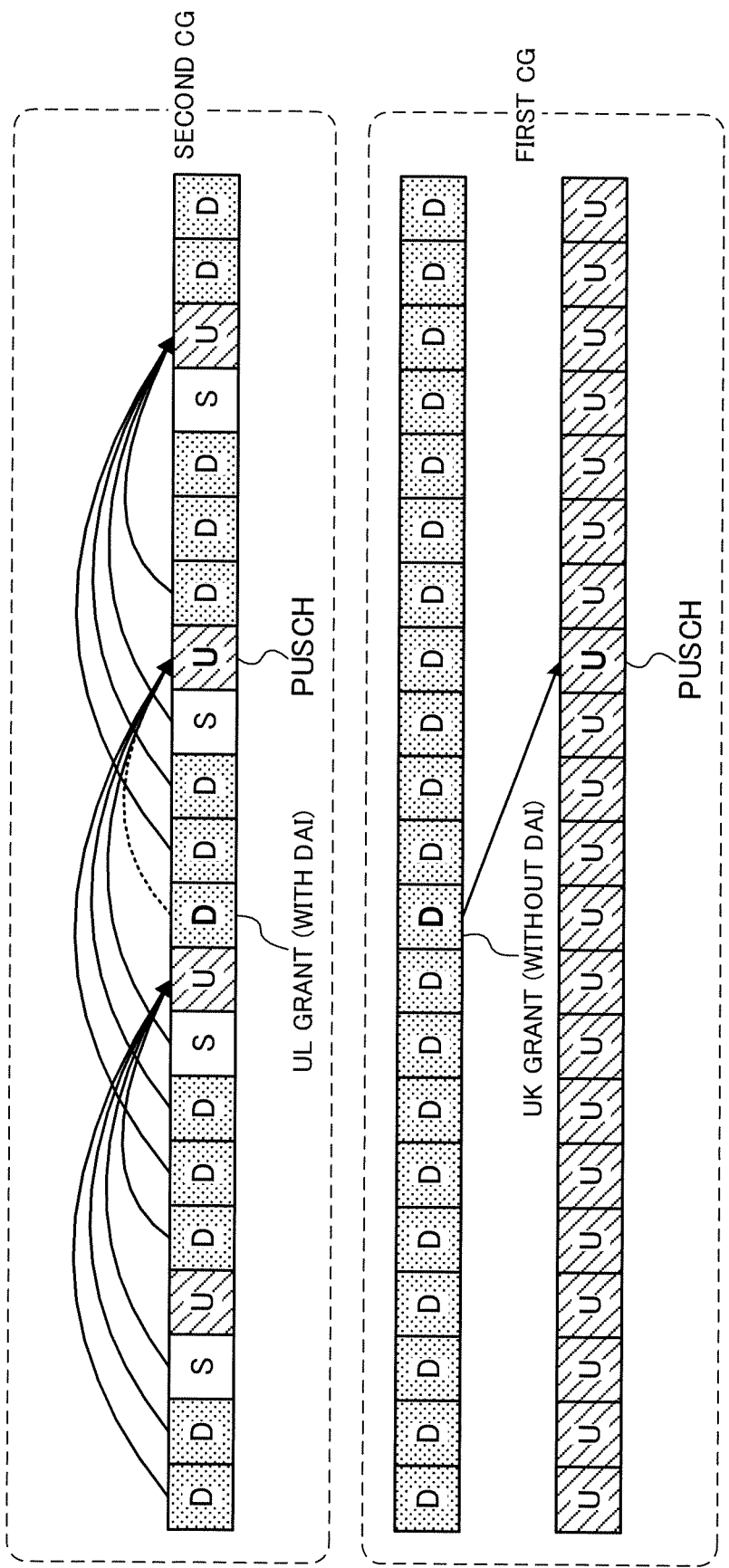
FIG. 7 is a diagram to show another example of the uplink control information transmission method according to the first example.

UL-DAIs are included in DCI (UL grant) for scheduling the second cell group and transmitted to the user terminal, so that the user terminal can properly transmit HARQ in the second cell group using the HARQ timing based on the TDD scheme (see FIG. 7).

On the other hand, in the first cell group, in which the HARQ-ACK timing based on the FDD scheme is used, DAI-based control can be made unnecessary. Therefore, DCI (UL grant) for scheduling the first cell group can be transmitted to the user terminal without including UL-DAIs. In this case, it is possible to suppress an increase in the overhead of the DCI transmitted from the radio base station.

The user terminal judges whether or not a UL-DAI is included in DCI (UL grant), for each cell group, and controls the transmission/reception operations (for example, HARQ feedback). For example, the user terminal calculates the payload size of DCI on the assumption that DAIs are not include in the DCI for the cell group that utilizes the HARQ timing based on the FDD scheme and that DAIs are included in the DCI for the cell group that uses the HARQ timing based on the TDD scheme. Then, based on this payload size, the user terminal can perform the receiving operation, such as blind decoding of DCI, in the PDCCH or the EPDCCH of the CC included in each cell group.

Figure 5:
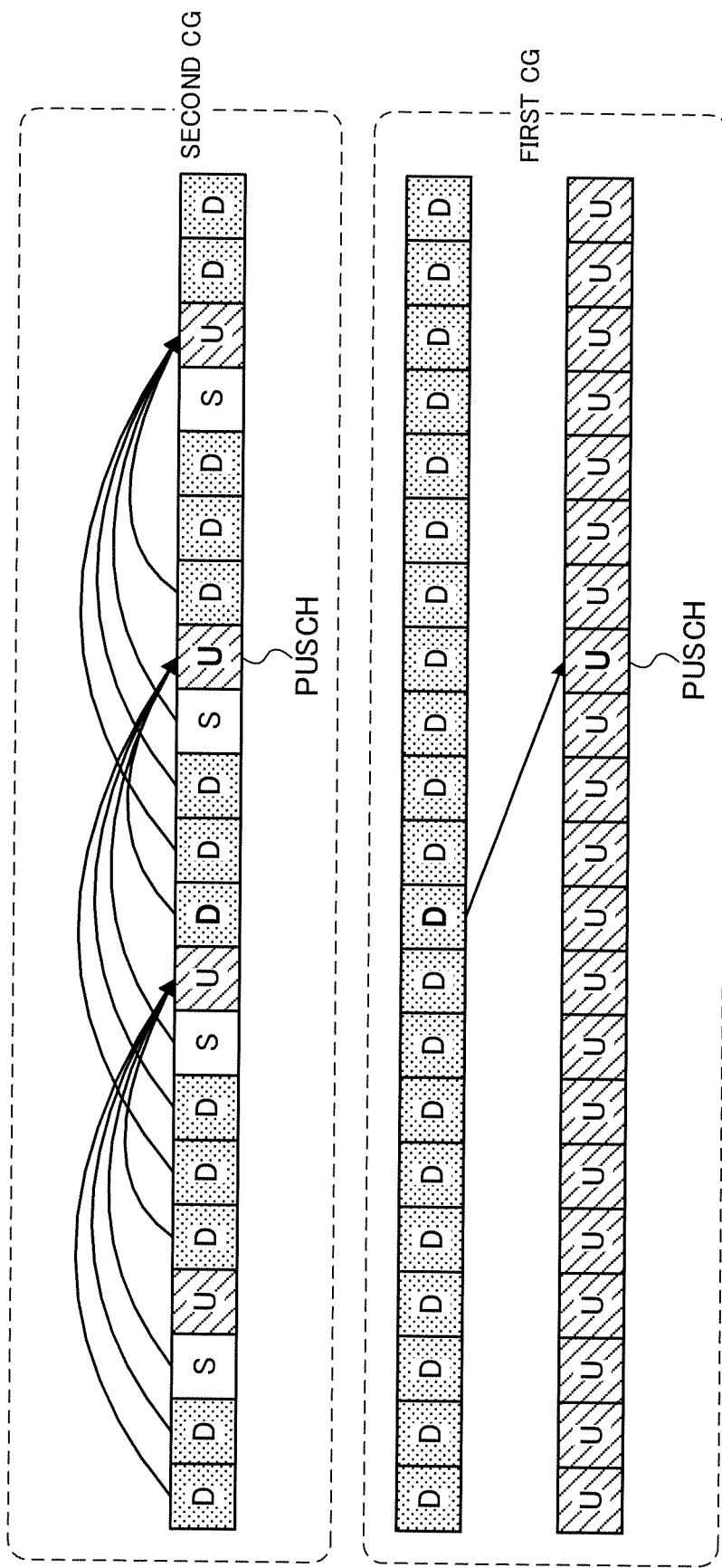
FIG. 5 is a diagram to show another example of the uplink control information transmission method according to the first example.

Although FIG. 5 and FIG. 7 show cases where one CC is configured in each cell group, even when a plurality of CCs are configured in each cell group, HARQ feedback (whether or not DAI is present) can be controlled based on the duplex mode used to configure the HARQ timing.

The HARQ timing of each cell group can be determined according to the duplex mode (FDD or TDD) applied to a predetermined CC in each cell group. The predetermined CC in each cell group can be the cell to transmit the PUCCH (PUCCH cell).

When the PUCCH cell of each cell group (for example, CC #4 in FIG. 4) is a TDD cell using TDD, the user terminal performs the transmission/reception processes on the assumption that a UL-DAI is included in the UL grant to allocate the PUSCH in this cell group. The transmission/reception processes include the decoding process, the HARQ-ACK transmission process (for example, determining the number of bits, etc.), and the like.

Further, when the PUCCH cell of each cell group (for example, CC #1 in FIG. 4) is an FDD cell using FDD, the user terminal performs the transmission/reception processes on the assumption that a UL-DAI is included in the UL grant to allocate the PUSCH in this cell group.

In this manner, by using DAIs according to the HARQ timing applied to each cell group, the number of HARQ-ACK bits to be multiplexed on the PUCCH or the PUSCH can be appropriately determined. Note that, in the first embodiment, it is also possible to use the UL transmission control in dual connectivity (DC) stipulated in Rel. 12.

Second Example

A case will be described with the second example where, when a plurality of cell groups each including at least one component carrier (CC) are configured, uplink control information transmission to use an uplink shared channel (UCI on PUSCH) is controlled across a plurality of cell groups.

Figure 8:
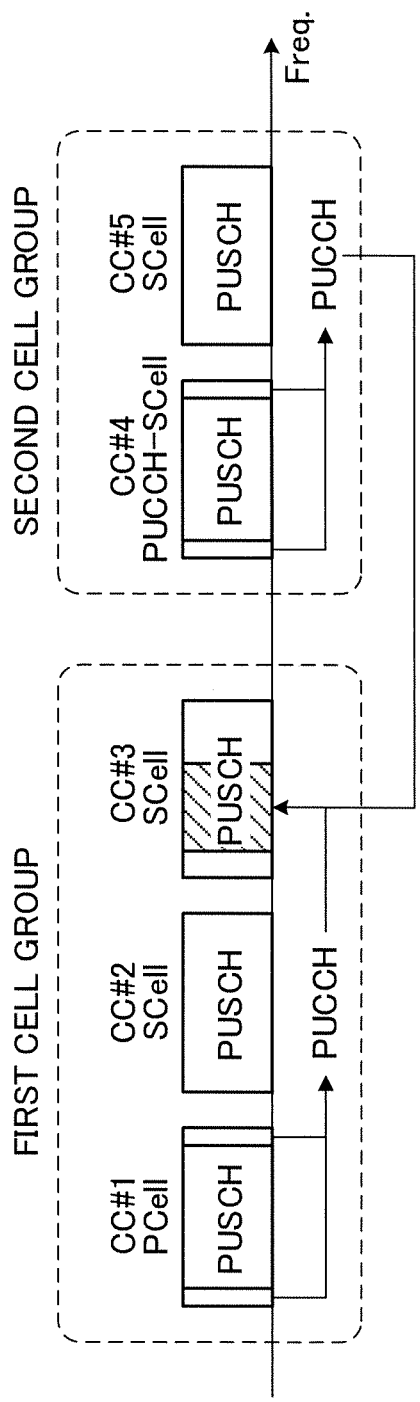
FIG. 8 is a diagram to show an example of controlling transmission of uplink control information using PUSCH between cell groups.

FIG. 8 shows an example of the case of controlling uplink control information transmission using the PUSCH (UCI on PUSCH) regardless of cell groups. FIG. 8 shows a case where a first cell group with three CCs and a second cell group with two CCs are configured in a user terminal.

Also, FIG. 8 shows a case where a PUCCH is transmitted by using CC #1, which serves as the PCell in the first cell group, and where a PUCCH is transmitted by using CC #4, which serves as a PUCCH-Scell in the second cell group.

For example, assume the case where, in a given subframe, a PUSCH is transmitted in CC #3 (SCell) of the first cell group and where no PUSCH is transmitted in the second cell group. In this case, in the first cell group, the control information (for example, HARQ-ACK) to be transmitted in the PUCCH of CC #1 if there is no PUSCH transmission is multiplexed and transmitted on the PUSCH of CC #3. Also, in the second cell group, the control information to be transmitted in the PUCCH of CC #4 if there is no PUSCH transmission is multiplexed and transmitted in the PUSCH of CC #3 of the first cell group.

As described above, in the second example, which is configured to control PUCCH transmission (PUCCH on SCell) on a per PUCCH cell group basis, when there is PUSCH transmission, each cell group's uplink control information is allocated to a predetermined cell where the PUSCH is transmitted. That is, when there is PUSCH transmission in a given CC, uplink control information is multiplexed on the PUSCH, irrespective of which PUCCH cell group the uplink control information belongs to.

This allows single carrier transmission to be implemented when uplink control information is transmitted in the PUSCH. As a result of this, compared to cases where multi-carrier transmission is required (see, for example, above FIG. 4), it is possible to prevent the situation where the PUSCH transmission power exceeds the maximum transmission power and is limited (power limited).

Further, the user terminal may transmit periodic channel state information (P-CSI) on a per cell group basis. For example, if periodic CSI (P-CSI) is produced in the same subframe in different cell groups, the user terminal can multiplex and transmit the periodic CSI of each cell group on the same CC's PUSCH. Alternatively, the user terminal may select the periodic CSI of one CC based on a predetermined condition (and drops the periodic CSIs of the other CCs), and multiplex and transmit the selected periodic CSI on the PUSCH.

Also, the user terminal can configure different HARQ timings in each cell group. For example, the user terminal can control HARQ transmission by applying the HARQ timing based on the FDD scheme to the first cell group (first CG), and control HARQ transmission by applying the HARQ timing based on the TDD scheme to the second cell group (second CG) (see FIG. 9).

In this case, in the timing (predetermined UL subframe) at which HARQ is transmitted in the second cell group using the HARQ timing based on the TDD scheme, the user terminal multiplexes the uplink control information of the two cell groups onto the PUSCH of a predetermined CC. In the case shown in FIG. 9, the user terminal transmits an HARQ corresponding to one DL subframe of the first cell group and HARQs corresponding to four DL subframes of the second cell group in the PDSCH of a predetermined CC (here, a CC of the first cell group).

In this case, how to determine the number of HARQ bits to feed back from the user terminal is the problem. For example, in CA of existing systems (Rel. 12 or earlier versions), when an FDD-based HARQ timing is applied, the user terminal determines the number of HARQ-ACK bits to transmit in the PUSCH (UCI on PUSCH) based on higher layer signaling.

To be more specific, the maximum value obtained from the number of CCs configured in the user terminal and the transmission mode (TM) of each CC is used as the number of HARQ-ACK bits. For example, when the number of CCs is 5 and the number of codewords (CWs) is 2, the number of HARQ-ACK bits is 10 (maximum). Also, for a CC where no DL signal is scheduled, a NACK is fed back. In this way, when applying existing FDD-based HARQ timing and multiplexing uplink control information on the PUSCH, HARQ-ACKs are limited to maximum 10 bits.

Figure 9:
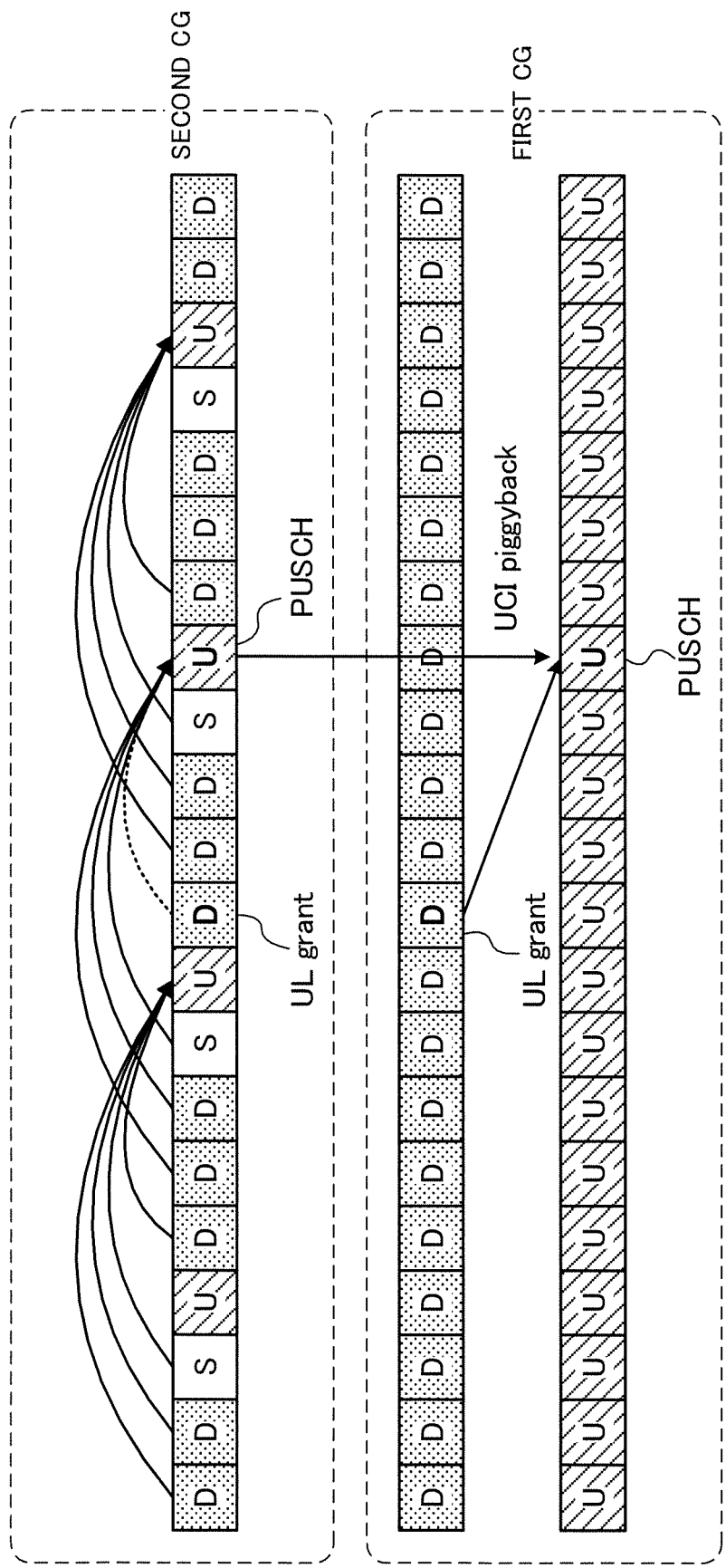
FIG. 9 is a diagram to show an example of the uplink control information transmission method according to the second example.

However, in FIG. 9, the uplink control information of the second cell group that uses the HARQ of the TDD scheme is multiplexed on the PUSCH of the cell using the HARQ of the FDD scheme. In this case, the number of HARQ-ACK bits included in the PUSCH transmitted in the cell using the FDD-scheme-based HARQ timing is not determined based only on "the number of CCs×the number of CWs," but is also influenced by the number of DL subframes in the time direction.

For example, when a first cell group is formed with one CC using FDD and a second cell group is formed with one CC using TDD (see, for example, FIG. 9), the HARQ-ACK bits to be allocated to the PUSCH of the cell of the first cell group are maximum 10 bits (=2×1+2×4). Also, if four TDD cells (4 CCs) are included in the second cell group, the HARQ-ACK bits to be allocated to the PUSCH of the cell of the first cell group are maximum 38 bits (=2×1+2×4×4).

Therefore, when UCI on PUSCH is applied between the cell groups using the HARQ timing based on the FDD scheme and the cell group using the HARQ timing based on the TDD scheme, how to control the transmission of HARQ-ACKs is the problem.

In order to solve such a problem, in the present embodiment, HARQ transmission is controlled based on predetermined conditions. Hereinafter, HARQ transmission methods according to a second example will be described. Although cases will be shown in the following description where HARQ-ACKs of the CC of the second cell group using the HARQ timing based on the TDD scheme are transmitted by using the uplink shared channel of the CC of the first cell group using the HARQ timing based on the FDD scheme, the present embodiment is not limited to this.

<First Method>

In the first method, when the uplink control information of each cell group is allocated to the PUSCH of the CC of the first cell group, the transmission of HARQ-ACKs is controlled according to the maximum number of bits that can be multiplexed on the PUSCH. The user terminal can determine the maximum number of bits that can be multiplexed on the PUSCH based on information reported in higher layer signaling. The information that is reported in higher layer signaling includes the number of CCs to be configured, the number of CWs configured per CC and the maximum number of DL subframes that can be fed back in one UL (for example, UL/DL configuration, and the like).

For example, assume that one CC that uses FDD is included in the first cell group and four CCs that use TDD are included in the second cell group. In this case, the user terminal controls the transmission of HARQ-ACKs on the assumption that 38 bits of HARQ-ACKs are transmitted. For example, assuming that there are 38 HARQ-ACK bits, the user terminal generates and encodes HARQ-ACK bits, and multiplexes these on the PUSCH.

The user terminal can control the encoding process based on the number of HARQ-ACK bits determined based on the information reported by higher layer signaling. For example, the user terminal can apply spatial bundling to the encoding of HARQ-ACKs if the number of HARQ-ACK bits is equal to or greater than a predetermined value. In this case, the user terminal can spatially bundle the HARQ-ACK bits of all the DL subframes in each CC and perform predetermined encoding on the HARQ-ACK bits after space bundling. When performing the encoding process, the user terminal can use different encoding according to the number of HARQ-ACK bits.

For example, if there are 38 HARQ-ACK bits, the user terminal can spatially bundle the HARQ-ACK bits of all the DL subframes of each CC (19 bits), and apply predetermined encoding to the 19 bits after spatial bundling. As for the predetermined encoding, when there are more than 11 bits, channel coding of existing systems can be used for HARQ-ACKs.

Figure 10:
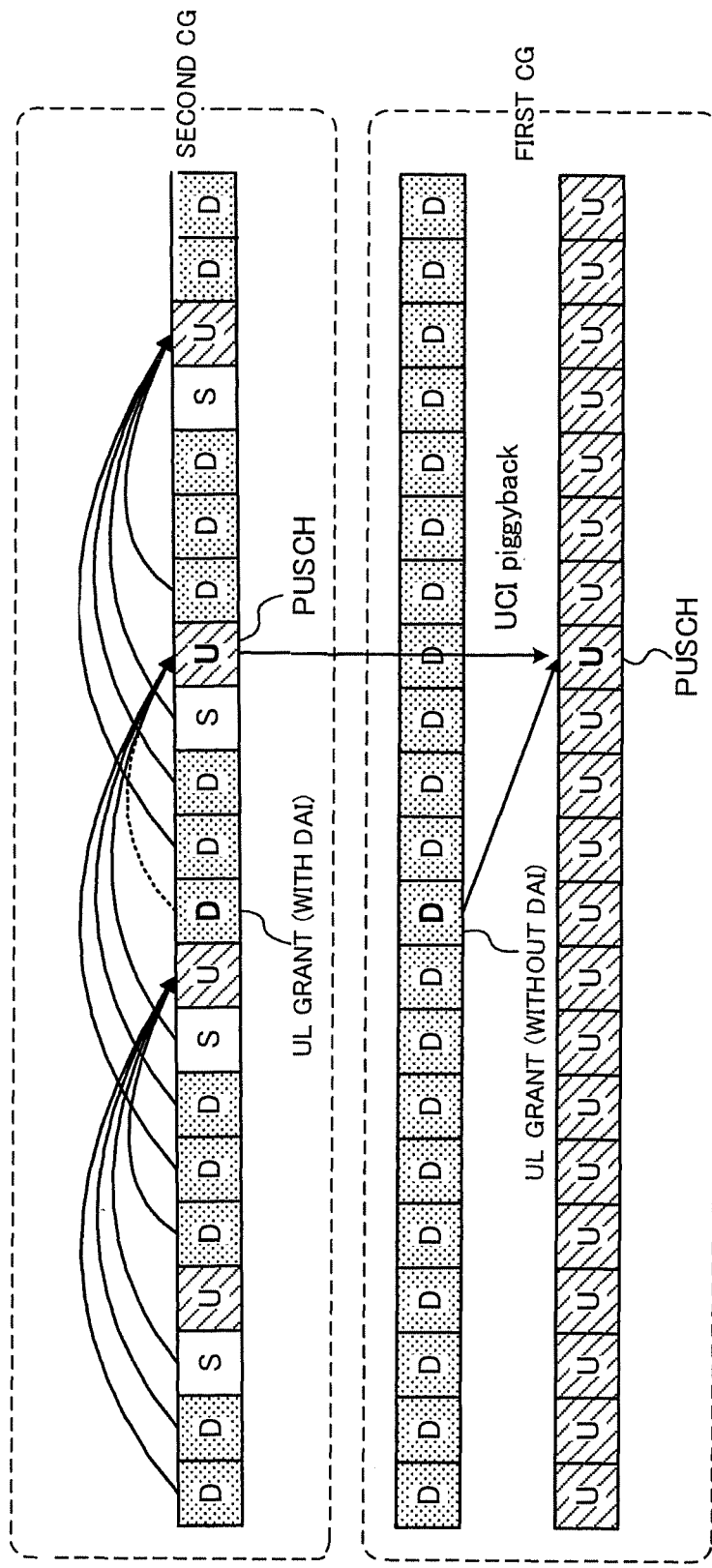
FIG. 10 is a diagram to show another example of the uplink control information transmission method according to the second example.

Also, in the first method, DCI (UL grant) to allocate the PUSCH to the CCs of the second cell group includes a UL-DAI and is transmitted to the user terminal. On the other hand, a UL grant that allocates the PUSCH to the CC of the first cell group can be configured not to include a UL-DAI (see FIG. 10).

The user terminal can judge the presence or absence of DAIs based on the duplex mode (FDD/TDD) applied to each cell group, and perform the receiving process (for example, blind decoding) of the PDCCH. In addition, the user terminal can control HARQ feedback assuming the maximum number of bits that can be used when HARQ-ACKs are transmitted in the PUSCH. In this case, the user terminal can perform control so that NACK is transmitted to the CCs and/or CWs where DL signals are not received.

In this way, the user terminal determines the HARQ-ACK bits taking into consideration the number of DL subframes in the second cell group, so that, even when these HARQ-ACKs are multiplexed on the PUSCH of the CC of the first cell group, the user terminal can transmit the HARQ-ACKs appropriately.

<Second Method>

The second method is configured such that, when the uplink control information of each cell group is allocated to the PUSCH of the CC of the first cell group, the number of HARQ-ACK bits is determined based on predetermined information. As the predetermined information, information reported by higher layer signaling, information notified by physical signaling, or the like can be used.

The information that is reported in higher layer signaling includes at least one of information about the number of CCs to be configured and information about the number of CWs configured in each CC. The information reported in physical signaling includes information about the number of scheduled DL subframes, which can be acquired by using, for example, DAIs. When using DAIs, the user terminal can determine the number of DL subframes to be scheduled based on the value specified by the UL-DAI (the number of DL subframes actually allocated).

For example, assume that one CC that uses FDD is included in the first cell group and four CCs that use TDD are included in the second cell group. In this case, the radio base station includes DAIs in downlink control information based on the DL subframes actually allocated to each cell, and transmits the downlink control information to the user terminal.

The user terminal can know the number of scheduled DL subframes based on the DAIs included in the downlink control information. Furthermore, the user terminal determines the number of HARQ-ACK bits to feed back based on the number of CCs and the number of CWs reported in higher layer signaling, and performs the transmission process (for example, the encoding process). Accordingly, when one CC that uses FDD is included in the first cell group and four CCs that use TDD is included in the second cell group, the radio base station and the user terminal can report/determine the number of HARQ-ACK bits in the range of 10 to 38 bits.

Also, the user terminal can control encoding according to the number of HARQ-ACK bits. For example, when the number of HARQ bits is 1, 2, 3 to 11 and 12 to 20, different encoding processes can be applied. Also, if the number of HARQ bits exceeds 21 bits, the user terminal may apply space bundling.

Figure 11:
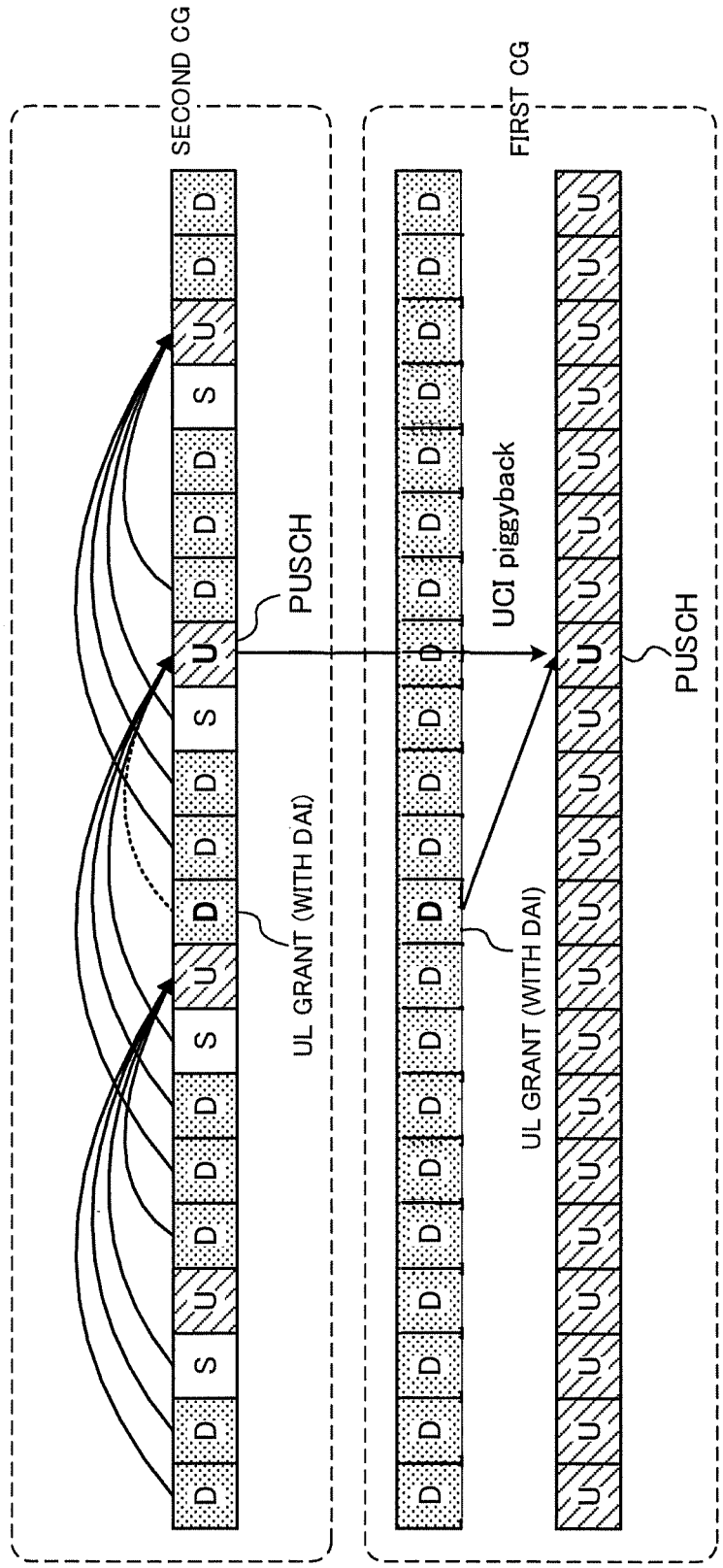
FIG. 11 is a diagram to show another example of the uplink control information transmission method according to the second example.

Also, the second method can be configured so that a UL-DAI can be included in DCIs (UL grants) that allocate the PUSCH to the CCs of the second cell group, and in a UL grant that allocates the PUSCH to the CC of the first cell group (see FIG. 11). Note that the user terminal can operate assuming that, when UL grants are present in a plurality of CCs, at least the UL-DAIs of each cell group have the same value.

The user terminal can perform the receiving process (for example, blind decoding) of the PDCCH on the assumption that DAIs are included in the DCIs transmitted from each cell group. Also, the user terminal may determine the number of bits when HARQ-ACKs are transmitted in the PUSCH, based on DAI (the number of scheduled DL subframes), in addition to the number of CCs and the number of CWs.

In this way, the user terminal determines the HARQ-ACK bits taking into consideration the number of DL subframes scheduled, so that, even when these HARQ-ACKs are multiplexed on the PUSCH of the CC of the first cell group, the user terminal can transmit the HARQ-ACKs appropriately. Particularly, whereas, in the first method, the maximum number of bits calculated based on higher layer signaling is the payload, according to the second method, the payload can be specified dynamically using UL-DAIs, so that, when the number of assignments is small, it is possible to reduce the payload to lower the coding rate, and improve the quality of UCI higher.

When uplink control information is transmitted using the PUSCH of the CC of the first cell group, the DAI to include in the UL grant for scheduling the CC of the first cell group can be included in UL grants that are transmitted in all DL subframes. In this case, the DAIs can have the same value (for example, DAI=1). By including a DAI in the UL grants of all DL subframes, the user terminal can perform PDCCH decoding assuming that the payload size is the same irrespective of the subframe index, so that the burden of the reception process can be reduced.

Alternatively, a DAI can be included only in the UL grant for a specific DL subframe. The specific DL subframe may be, for example, a subframe that can transmit HARQ of the second cell group. In this case, the DAI payload can be reduced in subframes other than the specific subframe, so that an increase in the overhead of downlink control information can be suppressed.

<Third Method>

Figure 12:
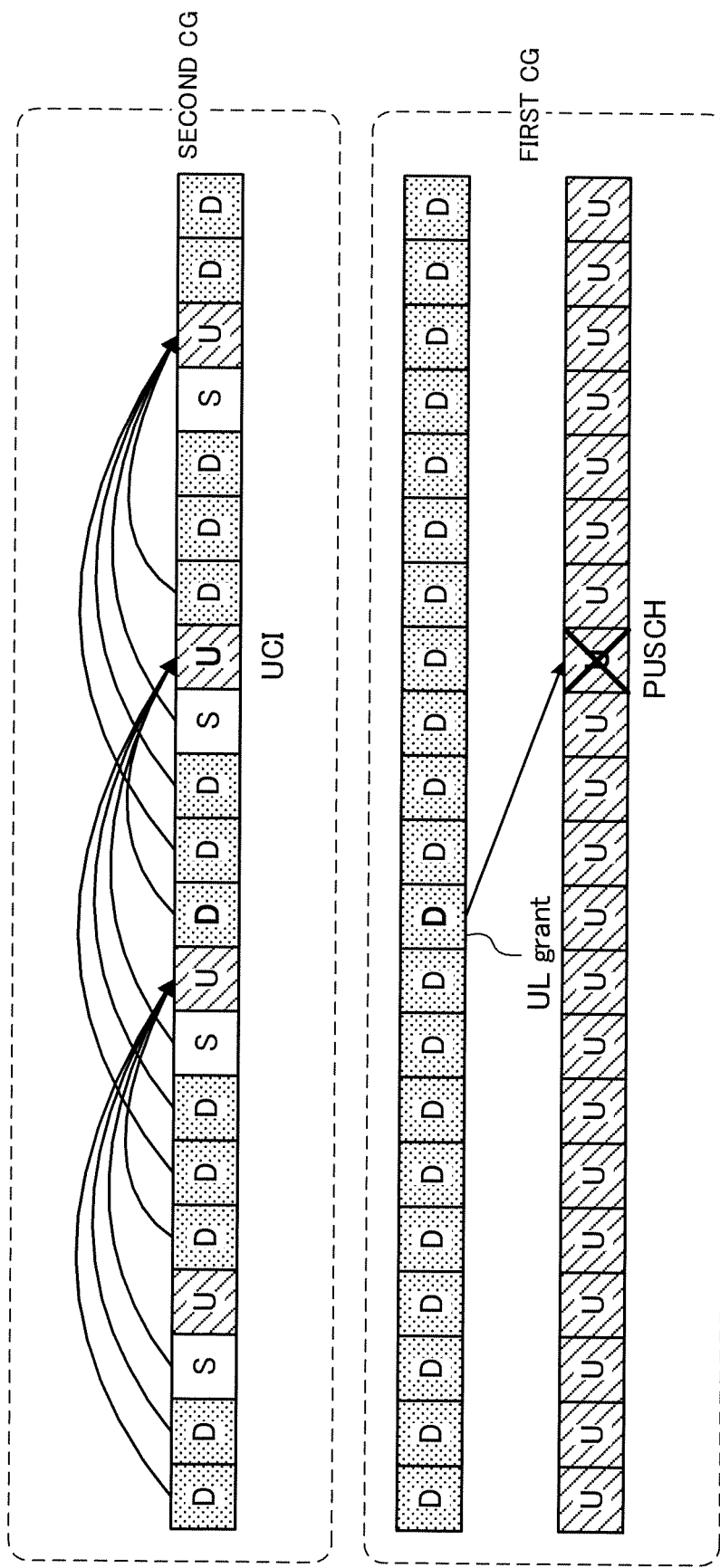
FIG. 12 is a diagram to show another example of the uplink control information transmission method according to the second example.

The third method is configured so that, when there is a cell (for example, the second cell group), in which an HARQ timing based on the TDD scheme is used, the user terminal does not transmit uplink control information using the PUSCH in a cell (for example, the first cell group), in which an HARQ timing based on the FDD scheme is used (see FIG. 12).

When uplink data (UL-SCH) transmission is assigned to the first cell group, the user terminal drops the uplink data, and transmits uplink control information by using the PUCCH and/or the PUSCH of a CC in the second cell group.

For example, if there is a UL grant allocating a PUSCH to a CC in the second cell group, the user terminal multiplexes and transmits the uplink control information of the CC of the first cell group on this PUSCH. On the other hand, when there is no UL grant allocating a PUSCH to the CCs of the second cell group, the user terminal multiplexes and transmits the uplink control information of the CC of the first cell group on the PUCCH of a CC (PUCCH-SCell) of the second cell group.

<User Capability Information>

Capability information regarding whether or not HARQ-ACKs for the second cell group can be multiplexed on the PUSCH of the CC of the first cell group may be reported from the user terminal to the base station in advance. For example, the user terminal reports this capability information to the radio base station in the form of UE capability signaling.

To a user terminal that can multiplex and transmit HARQ-ACKs for the second cell group on the PUSCH of the CC of the first cell group (a user terminal whose UE capability is "TRUE"), the first method or the second method is applied. On the other hand, to a user terminal that can multiplex and transmit HARQ-ACKs for the second cell group on the PUSCH of the CC of the first cell group (a user terminal whose UE capability is "FALSE"), the above third method is applied.

(Structure of Radio Communication System)

Now, the structure of the radio communication system according to an embodiment of the present invention will be described below. In this radio communication system, the radio communication methods according to the embodiment of the present invention are employed. Note that the radio communication methods of the above-described embodiment may be applied individually or may be applied in combination.

Figure 13:
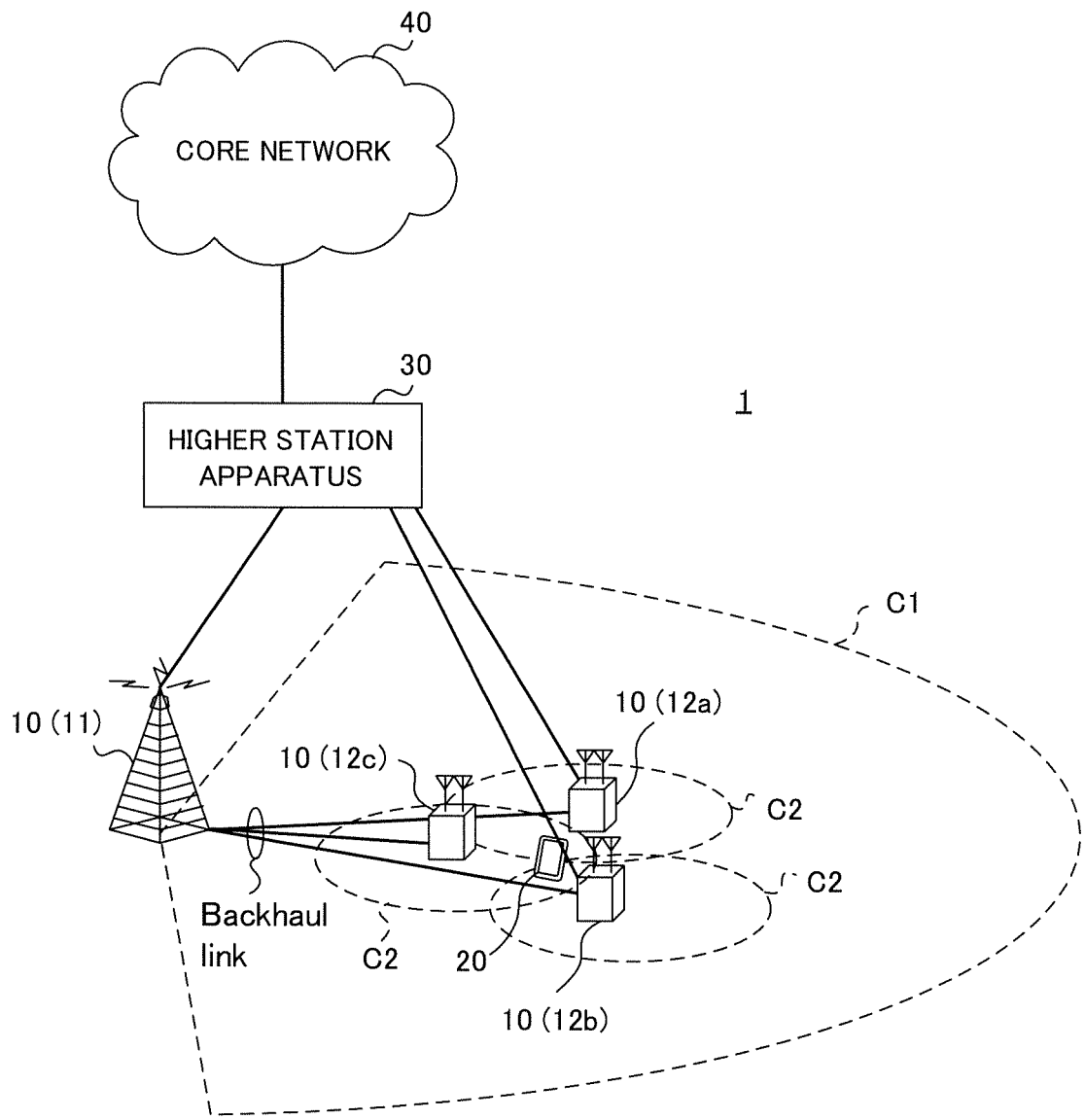
FIG. 13 is a schematic diagram to show an example of a radio communication system according to the present embodiment.

FIG. 13 is a diagram to show an example of a schematic structure of a radio communication system according to an embodiment of the present invention. Note that the radio communication system shown in FIG. 13 is a system to incorporate, for example, an LTE system, super 3G, an LTE-A system and so on. In this radio communication system, carrier aggregation (CA) and/or dual connectivity (DC) to bundle multiple component carriers (CCs) into one can be used. Note that this radio communication system may be referred to as "IMT-Advanced," or may be referred to as "4G," "5G," "FRA" (Future Radio Access) and so on.

The radio communication system 1 shown in FIG. 13 includes a radio base station 11 that forms a macro cell C1, and radio base stations 12a to 12c that form small cells C2, which are placed within the macro cell C1 and which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA by using at least two CCs (cells), or use six or more CCs.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Between the radio base station 11 and the radio base stations 12 (or between two radio base stations 12), wire connection (optical fiber, the X2 interface, etc.) or wireless connection may be established.

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs" (Home eNodeBs), "RRHs" (Remote Radio Heads), "transmitting/receiving points" and so on. Hereinafter the radio base stations 11 and 12 will be collectively referred to as "radio base stations 10," unless specified otherwise. The user terminals 20 are terminals to support various communication schemes such as LTE, LTE-A and so on, and may be either mobile communication terminals or stationary communication terminals.

In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined SIBs (System Information Blocks) are communicated in the PDSCH. Also, the MIB (Master Information Block) and so on are communicated by the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) including PDSCH and PUSCH scheduling information is communicated by the PDCCH. The number of OFDM symbols to use for the PDCCH is communicated by the PCFICH. HARQ delivery acknowledgement signals (ACKs/NACKs) in response to the PUSCH are communicated by the PHICH. The EPDCCH may be frequency-division-multiplexed with the PDSCH (downlink shared data channel) and used to communicate DCI and so on, like the PDCCH.

Also, as downlink reference signals, cell-specific reference signals (CRSs), channel state measurement reference signals (CSI-RSs: Channel State Information-Reference Signals), user-specific reference signals (DM-RSs: Demodulation Reference Signals) for use for demodulation, and other signals are included.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Also, downlink radio quality information (CQI: Channel Quality Indicator), delivery acknowledgment signals (HARQ-ACKs) and so on are communicated by the PUCCH. By means of the PRACH, random access preambles (RA preambles) for establishing connections with cells are communicated.

<Radio Base Station>

Figure 14:
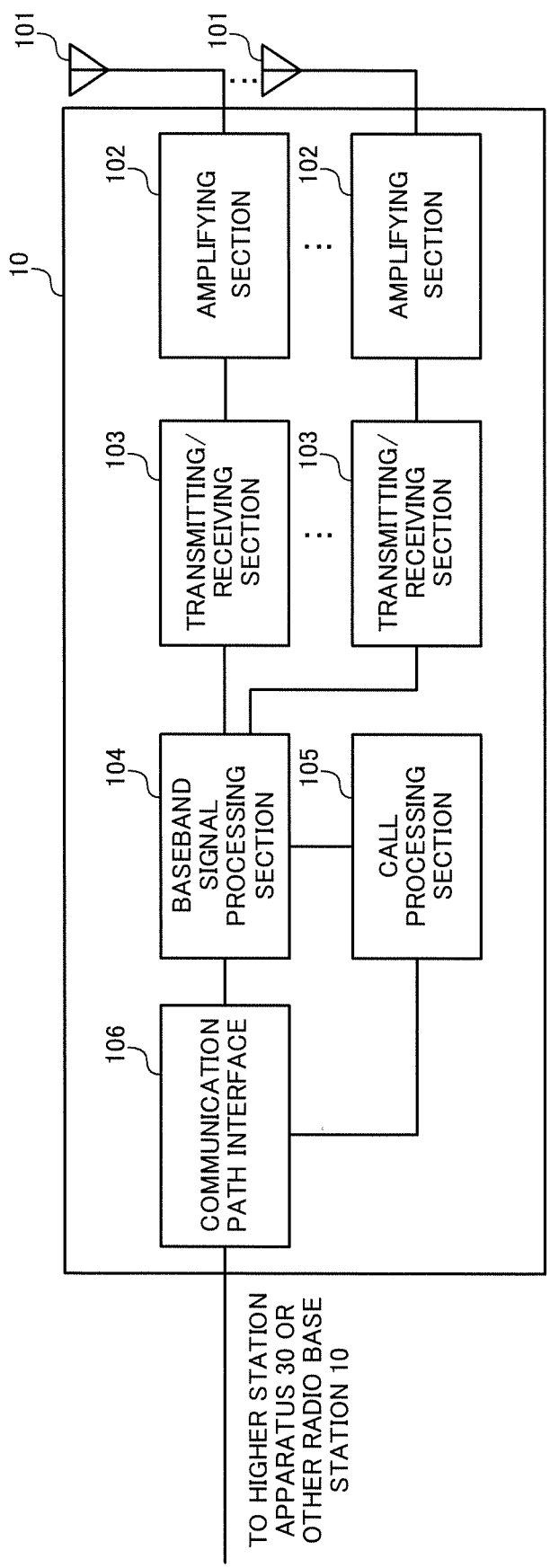
FIG. 14 is a diagram to explain an overall structure of a radio base station according to the present embodiment.

FIG. 14 is a diagram to show an example of an overall structure of a radio base station according to an embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that the transmitting/receiving sections 103 are comprised of transmitting sections and receiving sections.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Each transmitting/receiving section 103 converts baseband signals that are pre-coded and output from the baseband signal processing section 104 on a per antenna basis, into a radio frequency band. The radio frequency signals having been subjected to frequency conversion in the transmitting/receiving sections 103 are amplified in the amplifying sections 102, and transmitted from the transmitting/receiving antennas 101.

For example, the transmitting/receiving sections 103 transmit information about the CCs that use CA (for example, the number of CCs to be configured), information about the number of CWs in each CC, information about the UL/DL configurations to apply to TDD cells, etc. Further, the transmitting/receiving sections 103 can include DAIs in DCI for scheduling TDD cells and/or DCI for scheduling FDD cells and report these to the user terminals. Note that, for the transmitting/receiving sections 103, transmitters/receivers, transmitting/receiving circuits or transmitting/receiving devices that can be described based on common understanding of the technical field to which the present invention pertains can be used.

Meanwhile, as for uplink signals, radio frequency signals that are received in the transmitting/receiving antennas 101 are each amplified in the amplifying sections 102. Each transmitting/receiving section 103 receives uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. The communication path interface 106 transmits and receive s signals to and from neighboring radio base stations 10 (backhaul signaling) via an inter-base station interface (for example, optical fiber, the X2 interface, etc.).

Figure 15:
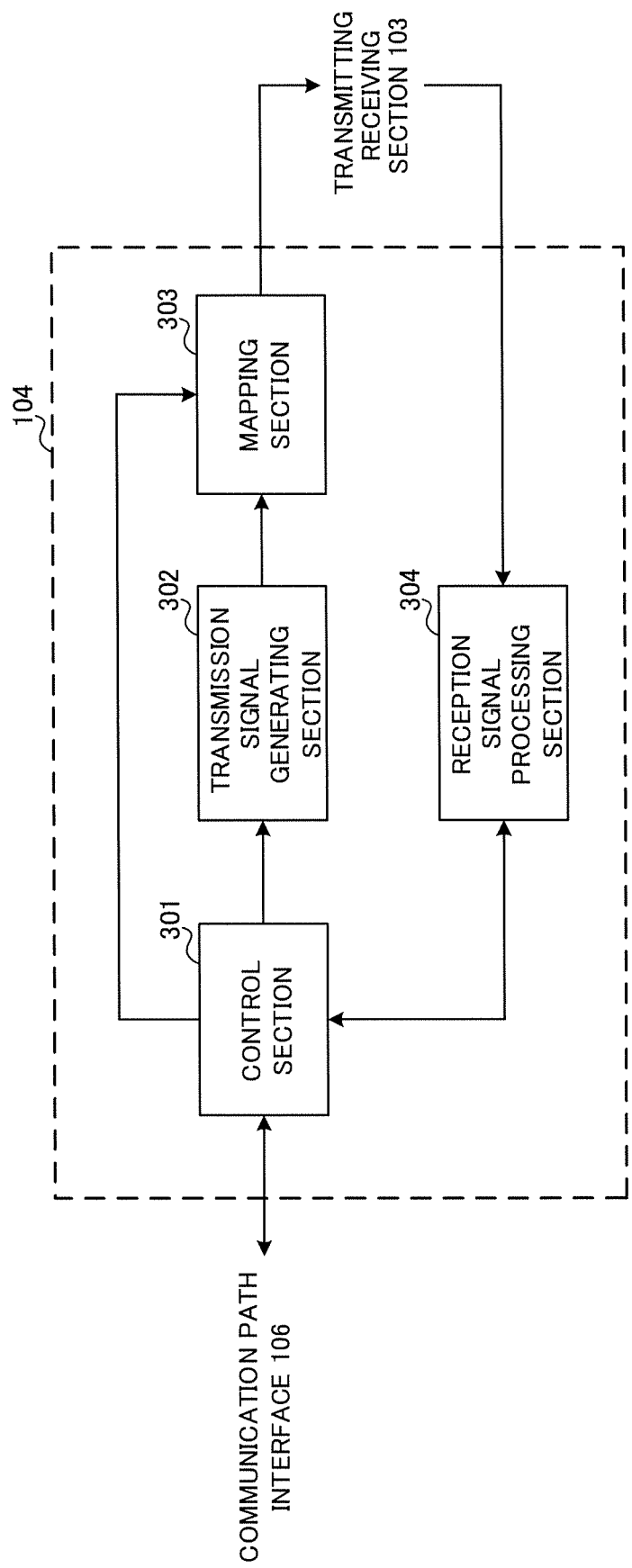
FIG. 15 is a diagram to explain a functional structure of a radio base station according to the present embodiment.

FIG. 15 is a diagram to show an example of a functional structure of a radio base station according to the present embodiment. Note that, although FIG. 15 primarily shows functional blocks that pertain to characteristic parts of the present embodiment, the radio base station 10 has other functional blocks that are necessary for radio communication as well. As shown in FIG. 15, the baseband signal processing section 104 has a control section (scheduler) 301, a transmission signal generating section (generating section) 302, a mapping section 303 and a received signal processing section 304.

The control section (scheduler) 301 controls the scheduling (for example, resource allocation) of downlink data signals that are transmitted in the PDSCH and downlink control signals that are communicated in the PDCCH and/or the EPDCCH. Furthermore, the control section (scheduler) 301 also controls the scheduling of system information, synchronization signals, paging information, CRSs, CSI-RSs and so on.

The control section 301 can control the CCs and cell groups to be configured in the user terminals. Also, the control section 301 controls the scheduling of uplink reference signals, uplink data signals that are transmitted in the PUSCH, uplink control signals that are transmitted in the PUCCH and/or the PUSCH, random access preambles that are transmitted in the PRACH, and so on. Note that, for the control section 301, a controller, a control circuit or a control device that can be described based on common understanding of the technical field to which the present invention pertains can be used.

The transmission signal generating section 302 generates DL signals based on commands from the control section 301 and outputs these signals to the mapping section 303. For example, the transmission signal generating section 302 generates DL assignments, which report downlink signal allocation information, and UL grants, which report uplink signal allocation information, based on commands from the control section 301. Further, the transmission signal generation unit 302 can generate downlink control information so that DAIs are included (or not included) in the DCI for scheduling the CC of each cell group. Note that, for the transmission signal generating section 302, a signal generator, a signal generating circuit or a signal generating device that can be described based on common understanding of the technical field to which the present invention pertains can be used.

The mapping section 303 maps the downlink signals generated in the transmission signal generating section 302 to predetermined radio resources based on commands from the control section 301, and outputs these to the transmitting/receiving sections 103. Note that, for the mapping section 303, mapper, a mapping circuit or a mapping device that can be described based on common understanding of the technical field to which the present invention pertains can be used.

The receiving process section 304 performs the receiving process (for example, demapping, demodulation, decoding and so on) of UL signals (for example, delivery acknowledgement signals (HARQ-ACKs), data signals that are transmitted in the PUSCH, and so on) transmitted from the user terminals. The processing results are output to the control section 301.

Also, by using the received signals, the received signal processing section 304 may measure the received power (for example, the RSRP (Reference Signal Received Power)), the received quality (for example, the RSRQ (Reference Signal Received Quality)), channel states and so on. Note that the measurement results in the received signal processing section 304 may be output to the control section 301. Note that a measurement section to perform the measurement operations may be provided apart from the received signal processing section 304.

The receiving process section 304 can be constituted by a signal processor, a signal processing circuit or a signal processing device, and a measurer, a measurement circuit or a measurement device that can be described based on common understanding of the technical field to which the present invention pertains.

<User Terminal>

Figure 16:
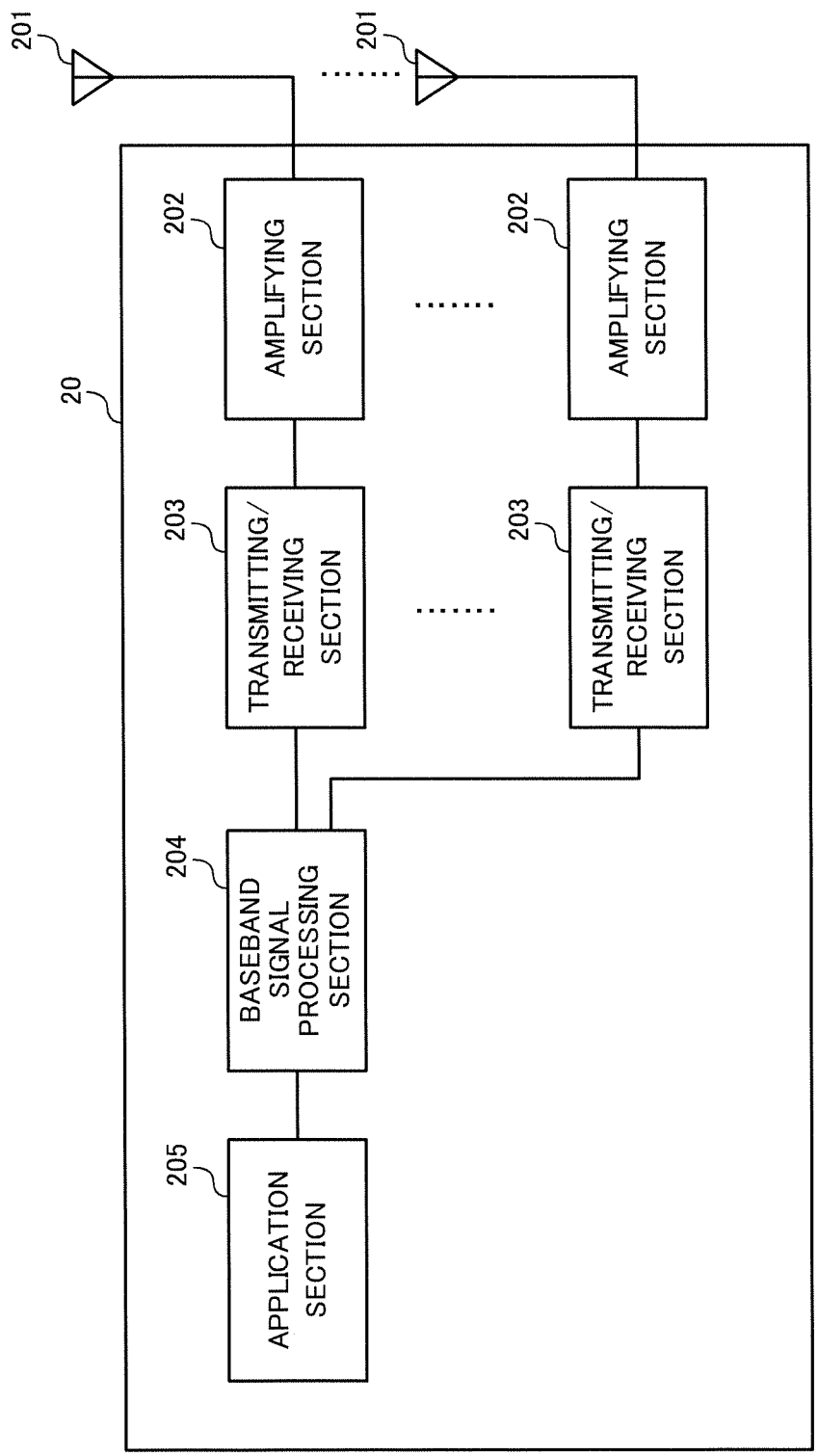
FIG. 16 is a diagram to explain an overall structure of a user terminal according to the present embodiment.

FIG. 16 is a diagram to show an example of an overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205. Note that the transmitting/receiving sections 203 may be comprised of transmitting sections and receiving sections.

Radio frequency signals that are received in a plurality of transmitting/receiving antennas 201 are each amplified in the amplifying sections 202. Each transmitting/receiving section 203 receives the downlink signals amplified in the amplifying sections 202. The received signal is subjected to frequency conversion and converted into the baseband signal in the transmitting/receiving sections 203, and output to the baseband signal processing section 204.

The transmitting/receiving sections 203 transmit uplink control information (for example, HARQ-ACKs) that is generated based on DL signals transmitted from the radio base station. Also, the transmitting/receiving sections 203 can report the user terminal's capability information (capability) to the radio base station. Further, the transmitting/receiving sections 203 can receive information about the number of CCs to be configured, information about the CWs of each CC, the UL/DL configuration and so on. Note that, for the transmitting/receiving sections 203, transmitters/receivers, transmitting/receiving circuits or transmitting/receiving devices that can be described based on common understanding of the technical field to which the present invention pertains can be used.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to each transmitting/receiving section 203. The baseband signal that is output from the baseband signal processing section 204 is converted into a radio frequency bandwidth in the transmitting/receiving sections 203. The radio frequency signals that are subjected to frequency conversion in the transmitting/receiving sections 203 are amplified in the amplifying sections 202, and transmitted from the transmitting/receiving antennas 201.

Figure 17:
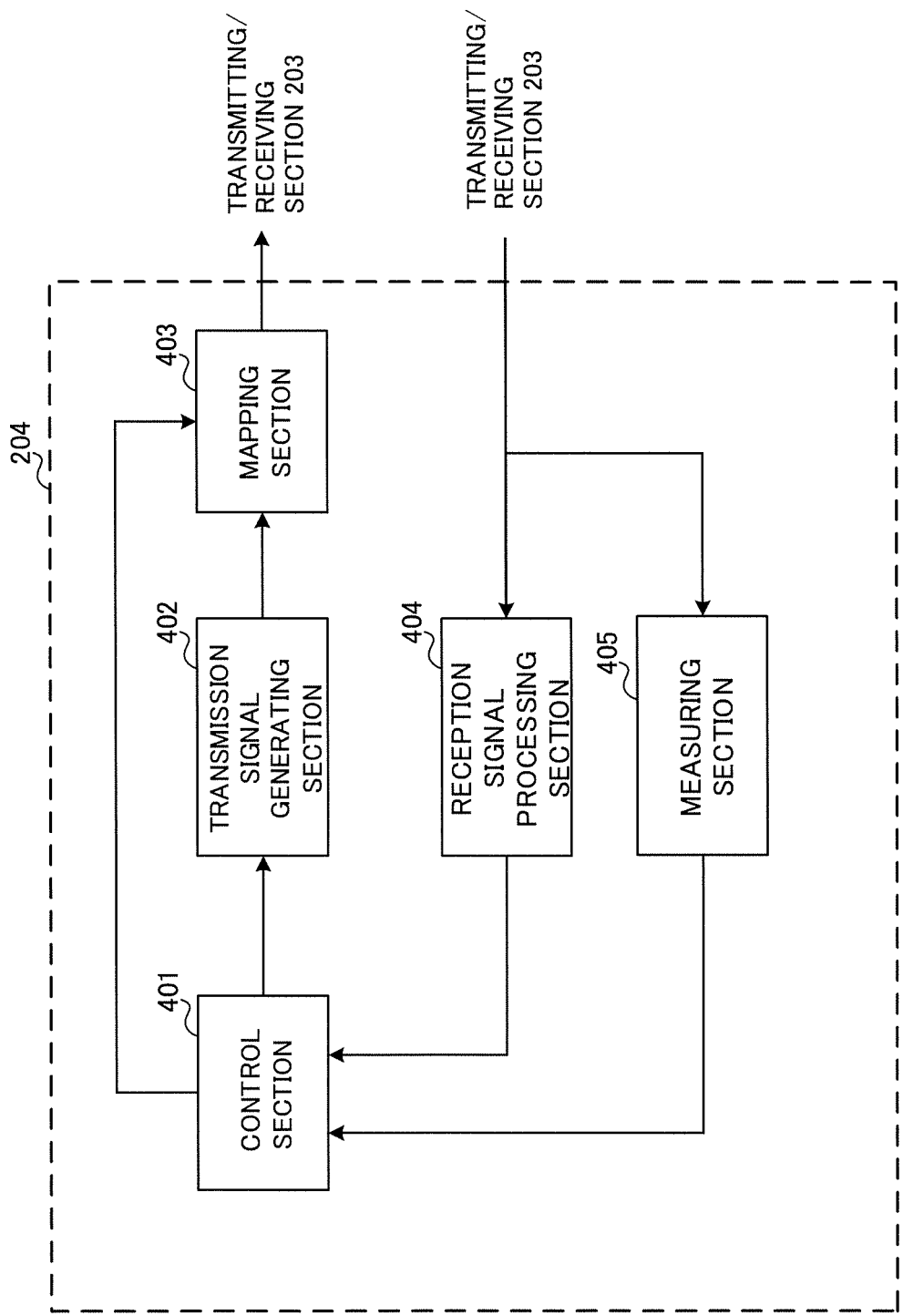
FIG. 17 is a diagram to explain a functional structure of a user terminal according to the present embodiment.

FIG. 17 is a diagram to show an example of a functional structure of a user terminal according to the present embodiment. Note that, although FIG. 17 primarily shows functional blocks that pertain to characteristic parts of the present embodiment, the user terminal 20 has other functional blocks that are necessary for radio communication as well. As shown in FIG. 17, the baseband signal processing section 204 provided in the user terminal 20 has a control section 401, a transmission signal generating section 402, a mapping section 403, a received signal processing section 404 and a decision section 405.

The control section 401 can control the transmission signal generating section 402, the mapping section 403 and the received signal processing section 404. For example, the control section 401 acquires the downlink control signals (signals transmitted in the PDCCH/EPDCCH) and downlink data signals (signals transmitted in the PDSCH) transmitted from the radio base station 10, from the received signal processing section 404. The control section 401 controls the generation/transmission of uplink control signals (for example, HARQ-ACKs and so on) and uplink data based on downlink control information (UL grants), the result of deciding whether or not retransmission control is necessary for downlink data, and so on.

Further, the control section 401 can control uplink control information transmission to use an uplink control channel of a SCell (PUCCH on SCell) and uplink control information to use an uplink shared channel (UCI on PUSCH) in each of a plurality of cell groups, each including at least one CC (see FIG. 4). Further, the control section 401 can control HARQ transmission by applying an HARQ timing based on the FDD scheme to the first cell group, and control HARQ transmission by applying an HARQ timing based on the TDD scheme to the second cell group.

Furthermore, the control section 401 can control uplink control information transmission to use an uplink control channel (PUCCH on SCell) in each of a plurality of cell groups, each including at least one CC, and control uplink control information to use an uplink shared channel (UCI on PUSCH) across a plurality of cell groups (see FIG. 8).

Further, the control section 401 can perform control so that HARQ for the second cell group is transmitted using an uplink shared channel of a CC in the first cell group. In this case, the control section 401 can control the number of HARQ bits based on the number of DL subframes corresponding to the uplink shared channel. Alternatively, the control section 401 may control the number of HARQ bits based on the number of DL subframes to be scheduled (for example, the DAI value included in downlink control information). Alternatively, the control section 401 may perform control so that the uplink control information transmission using the uplink shared channel is not performed in the CCs of the first cell group.

For the control section 401, a controller, a control circuit or a control device that can be described based on common understanding of the technical field to which the present invention pertains can be used.

The transmission signal generating section 402 generates UL signals based on commands from the control section 401, and outputs these signals to the mapping section 403. For example, the transmission signal generating section 402 generates uplink control signals such as delivery acknowledgement signals (HARQ-ACKs), channel state information (CSI) and so on, based on commands from the control section 401.

Also, the transmission signal generating section 402 generates uplink data signals based on commands from the control section 401. For example, when a UL grant is included in a downlink control signal that is reported from the radio base station 10, the control section 401 commands the transmission signal generating section 402 to generate an uplink data signal. Also, the transmission signal generating section 402 generates UL signals from the decisions (ACKs/NACKs) made in the decision section 405. For the transmission signal generating section 402, a signal generator, a signal generating circuit or a signal generating device that can be described based on common understanding of the technical field to which the present invention pertains can be used.

The mapping section 403 maps the uplink signals (uplink control signals and/or uplink data) generated in the transmission signal generating section 402 to radio resources based on commands from the control section 401, and output the result to the transmitting/receiving sections 203. For the mapping section 403, mapper, a mapping circuit or a mapping device that can be described based on common understanding of the technical field to which the present invention pertains can be used.

The received signal processing section 404 performs the receiving process (for example, demapping, demodulation, decoding and so on) of the DL signals (for example, downlink control signals that are transmitted from the radio base station in the PDCCH/EPDCCH, downlink data signals transmitted in the PDSCH, and so on). The received signal processing section 404 outputs the information received from the radio base station 10, to the control section 401 and the decision section 405. Note that, for the received signal processing section 404, a signal processor/measurer, a signal processing/measurement circuit or a signal processing/measurement device that can be described based on common understanding of the technical field to which the present invention pertains can be used. Also, the received signal processing section 404 can constitute the receiving section according to the present invention.

The decision section 405 makes retransmission control decisions (ACKs/NACKs) based on the decoding results in the receiving process section 404, and, furthermore, outputs the results to the control section 401. For the decision section 405, a decision maker, a decision making circuit or a decision making device that can be described based on common understanding of the technical field to which the present invention pertains can be used.

Note that the block diagrams that have been used to describe the above embodiments show blocks in functional units. These functional blocks (components) may be implemented in arbitrary combinations of hardware and software. Also, the means for implementing each functional block is not particularly limited. That is, each functional block may be implemented with one physically-integrated device, or may be implemented by connecting two physically-separate devices via radio or wire and using these multiple devices.

For example, part or all of the functions of radio base stations 10 and user terminals 20 may be implemented using hardware such as an ASIC (Application-Specific Integrated Circuit), a PLD (Programmable Logic Device), an FPGA (Field Programmable Gate Array), and so on. Also, the radio base stations 10 and user terminals 20 may be implemented with a computer device that includes a processor (CPU), a communication interface for connecting with networks, a memory and a computer-readable storage medium that holds programs.

Here, the processor and the memory are connected with a bus for communicating information. Also, the computer-readable recording medium is a storage medium such as, for example, a flexible disk, an opto-magnetic disk, a ROM, an EPROM, a CD-ROM, a RAM, a hard disk and so on. Also, the programs may be transmitted from the network through, for example, electric communication channels. Also, the radio base stations 10 and user terminals 20 may include input devices such as input keys and output devices such as displays.

The functional structures of the radio base stations 10 and user terminals 20 may be implemented with the above-described hardware, may be implemented with software modules that are executed on the processor, or may be implemented with combinations of both. The processor controls the whole of the user terminals by running an operating system. Also, the processor reads programs, software modules and data from the storage medium into the memory, and executes various types of processes. Here, these programs have only to be programs that make a computer execute each operation that has been described with the above embodiments. For example, the control section 401 of the user terminals 20 may be stored in the memory and implemented by a control program that operates on the processor, and other functional blocks may be implemented likewise.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining example s, and should by no means be construed to limit the present invention in any way.

The disclosure of Japanese Patent Application No. 2015-076143, filed on Apr. 2, 2015, including the specification, drawings and abstract, is incorporated herein by reference in its entirety.

The invention claimed is:

1. A terminal communicating with a radio base station by using carrier aggregation, the terminal comprising:
a receiver that receives a downlink (DL) signal transmitted from the radio base station and including downlink control information (DCI) including a total Downlink Assignment Index (DAI);
a processor that determines a number of bits for hybrid automatic request acknowledgement (HARQ-ACK) based on the total DAI and not based on a counter DAI, and bundles HARQ-ACK bits in one cell group; and
a transmitter that transmits the HARQ-ACK,
wherein the DCI indicates a physical uplink shared channel (PUSCH) for transmitting the HARQ-ACK, and
wherein the total DAI included in the DCI is related to information of a physical downlink shared channel (PDSCH).

2. The terminal according to claim 1, wherein the total DAI included in the DCI is related to a total number of the PDSCH.

3. The terminal according to claim 1, wherein the terminal performs uplink control information (UCI) transmission on an uplink control channel and UCI transmission on an uplink shared channel per physical uplink control channel (PUCCH) cell group.

4. The terminal according to claim 2, wherein the terminal performs uplink control information (UCI) transmission on an uplink control channel and UCI transmission on an uplink shared channel per physical uplink control channel (PUCCH) cell group.

5. The terminal according to claim 1, wherein the transmitter transmits the HARQ-ACK to one cell group by using a frequency division duplex (FDD) scheme and transmits the HARQ-ACK to another cell group by using a time division duplex (TDD) scheme.

6. A radio communication method for a terminal communicating with a radio base station by using carrier aggregation, the radio communication method comprising:
receiving a downlink (DL) signal transmitted from the radio base station and including downlink control information (DCI) including a total Downlink Assignment Index (DAI);
determining a number of bits for hybrid automatic request acknowledgement (HARQ-ACK) based on the total DAI and not based on a counter DAI, and bundling HARQ-ACK bits in one cell group; and
transmitting the HARQ-ACK,
wherein the DCI indicates a physical uplink shared channel (PUSCH) for transmitting the HARQ-ACK, and
wherein the total DAI included in the DCI is related to information of a physical downlink shared channel (PDSCH).

7. The terminal according to claim 1, wherein the DCI is downlink control information which schedules the PUSCH.

8. A system comprising a radio base station and a terminal which communicate with each other using carrier aggregation, wherein:

the terminal comprises:
- a receiver that receives a downlink (DL) signal transmitted from the radio base station and including downlink control information (DCI) including a total Downlink Assignment Index (DAI);
- a processor that determines a number of bits for hybrid automatic request acknowledgement (HARQ-ACK) based on the total DAI and not based on a counter DAI, and bundles HARQ-ACK bits in one cell group; and
- a transmitter that transmits the HARQ-ACK, and the base station comprises:
- a transmitter that transmits, to the terminal, the DL signal including the DCI and the total DAI; and
- a receiver that receives the HARQ-ACK, wherein the DCI indicates a physical uplink shared channel (PUSCH) for transmitting the HARQ-ACK, and wherein the total DAI included in the DCI is related to information of a physical downlink shared channel (PDSCH).

* * * * *